US012701418B2

(12) United States Patent
Srinivas et al.

(10) Patent No.: US 12,701,418 B2
(45) Date of Patent: Aug. 4, 2026

(54) AUTHENTICATION AND AUTHORIZATION IN A PRIVATE MOBILE NETWORK

(71) Applicant: VeloCloud Networks, LLC, Santa Clara, CA (US)

(72) Inventors: Anand Srinivas, San Francisco, CA (US); Xiao H. Gao, Chapel Hill, NC (US); Sameer Naik, San Jose, CA (US)

(73) Assignee: VELOCLOUD NETWORKS, LLC, Santa Clara, CA (US)

( * ) Notice: Subject to any disclaimer, the term of this patent is extended or adjusted under 35 U.S.C. 154(b) by 524 days.

(21) Appl. No.: 18/071,554

(22) Filed: Nov. 29, 2022

(65) Prior Publication Data

US 2024/0073692 A1 Feb. 29, 2024

Related U.S. Application Data

(60) Provisional application No. 63/402,057, filed on Aug. 29, 2022.

(51) Int. Cl.
*H04W 12/08* (2021.01)
*H04L 9/40* (2022.01)
(Continued)

(52) U.S. Cl.
CPC ....... *H04W 12/086* (2021.01); *H04L 12/4633* (2013.01); *H04L 12/66* (2013.01);
(Continued)

(58) Field of Classification Search
CPC ... H04W 12/086; H04W 76/12; H04W 12/35; H04W 8/18; H04W 12/06; H04W 12/08;
(Continued)

(56) References Cited

U.S. PATENT DOCUMENTS

| | | |
|---|---|---|
| 9,450,817 B1 | 9/2016 | Bahadur et al. |
| 9,843,624 B1 | 12/2017 | Taaghol et al. |

(Continued)

OTHER PUBLICATIONS

Non-Published Commonly Owned International Patent Application PCT/US2023/031449, filed Aug. 29, 2023, 55 pages, VMware, Inc.

(Continued)

*Primary Examiner* — Khawar Iqbal
(74) *Attorney, Agent, or Firm* — BainwoodHuang

(57) ABSTRACT

Some embodiments provide a method for implementing a software-defined private mobile network (SD-PMN) for an entity. At a physical location of the entity, the method deploys a first set of control plane components for the SD-PMN, the first set of control plane components including a security gateway, a user-plane function (UPF), an AMF (access and mobility management function), and an SMF (session management function). At an SD-WAN (software-defined wide area network) PoP (point of presence) belonging to a provider of the SD-PMN, the method deploys a second set of control plane components for the SD-PMN that includes a subscriber database that stores data associated with users of the SD-PMN. The method uses an SD-WAN edge router located at the physical location of the entity and a SD-WAN gateway located at the SD-WAN PoP to establish a connection from the physical location of the entity to the SD-WAN PoP.

20 Claims, 19 Drawing Sheets

(51) Int. Cl.

| | |
|---|---|
| *H04L 12/46* | (2006.01) |
| *H04L 12/66* | (2006.01) |
| *H04L 41/0654* | (2022.01) |
| *H04L 41/0806* | (2022.01) |
| *H04L 41/0895* | (2022.01) |
| *H04L 41/122* | (2022.01) |
| *H04L 41/5019* | (2022.01) |
| *H04L 45/28* | (2022.01) |
| *H04L 45/64* | (2022.01) |
| *H04L 45/74* | (2022.01) |
| *H04L 45/76* | (2022.01) |
| *H04L 45/80* | (2022.01) |
| *H04W 8/18* | (2009.01) |
| *H04W 12/06* | (2021.01) |
| *H04W 12/086* | (2021.01) |
| *H04W 12/30* | (2021.01) |
| *H04W 16/18* | (2009.01) |
| *H04W 24/04* | (2009.01) |
| *H04W 36/30* | (2009.01) |
| *H04W 40/24* | (2009.01) |
| *H04W 76/12* | (2018.01) |
| *H04W 84/04* | (2009.01) |
| *H04W 88/16* | (2009.01) |

(52) U.S. Cl.
CPC ...... *H04L 41/0654* (2013.01); *H04L 41/0806* (2013.01); *H04L 41/0895* (2022.05); *H04L 41/122* (2022.05); *H04L 41/5019* (2013.01); *H04L 45/28* (2013.01); *H04L 45/64* (2013.01); *H04L 45/74* (2013.01); *H04L 45/76* (2022.05); *H04L 45/80* (2022.05); *H04L 63/0272* (2013.01); *H04W 8/18* (2013.01); *H04W 12/06* (2013.01); *H04W 12/08* (2013.01); *H04W 12/35* (2021.01); *H04W 16/18* (2013.01); *H04W 24/04* (2013.01); *H04W 36/30* (2013.01); *H04W 40/24* (2013.01); *H04W 40/246* (2013.01); *H04W 76/12* (2018.02); *H04W 84/045* (2013.01); *H04W 88/16* (2013.01)

(58) Field of Classification Search
CPC ..... H04W 16/18; H04W 36/30; H04W 40/24; H04W 40/246; H04W 84/045; H04W 88/16; H04L 45/80; H04L 41/122; H04L 41/0895; H04L 45/76; H04L 12/4633; H04L 12/66; H04L 41/0654; H04L 41/0806; H04L 41/5019; H04L 45/28; H04L 45/64; H04L 45/74; H04L 63/0272
See application file for complete search history.

(56) References Cited

U.S. PATENT DOCUMENTS

| | | | |
|---|---|---|---|
| 9,866,433 | B1 | 1/2018 | Fakhouri et al. |
| 10,523,531 | B2 | 12/2019 | Zuerner |
| 10,887,276 | B1 | 1/2021 | Parulkar et al. |
| 11,188,376 | B1 | 11/2021 | Alexander et al. |
| 11,375,005 | B1 | 6/2022 | Rolando et al. |
| 11,599,376 | B1 | 3/2023 | Viswanathan et al. |
| 11,765,087 | B1 | 9/2023 | Balmakhtar et al. |
| 12,015,529 | B1 * | 6/2024 | Thakkar ............... H04W 12/06 |
| 12,207,354 | B2 * | 1/2025 | Shekhar ................ H04W 8/186 |
| 12,231,949 | B2 * | 2/2025 | Qiao ...................... H04W 8/20 |
| 2017/0005983 | A1 | 1/2017 | Doukhvalov et al. |
| 2018/0367578 | A1 | 12/2018 | Verma et al. |
| 2019/0109821 | A1 | 4/2019 | Clark et al. |
| 2020/0052969 | A1 | 2/2020 | Xu et al. |
| 2020/0067831 | A1 * | 2/2020 | Spraggins ........... H04L 41/5009 |
| 2021/0105225 | A1 | 4/2021 | Stammers et al. |
| 2021/0152513 | A1 | 5/2021 | Grayson et al. |
| 2021/0297891 | A1 | 9/2021 | Berzin et al. |
| 2022/0060408 | A1 | 2/2022 | Manickam et al. |
| 2022/0103597 | A1 | 3/2022 | Gobena et al. |
| 2022/0166755 | A1 | 5/2022 | Moore et al. |
| 2022/0182332 | A1 | 6/2022 | Christofi et al. |
| 2022/0182826 | A1 * | 6/2022 | Gundavelli ......... H04W 12/086 |
| 2022/0400053 | A1 | 12/2022 | Liu et al. |
| 2023/0102552 | A1 | 3/2023 | Ali et al. |
| 2023/0123775 | A1 | 4/2023 | Sivakumar et al. |
| 2023/0275833 | A1 * | 8/2023 | Hyun ...................... H04L 47/00 |
| | | | 370/389 |
| 2023/0421253 | A1 * | 12/2023 | Palermo ............. H04B 7/18591 |
| 2024/0015817 | A1 * | 1/2024 | Lim ...................... H04W 76/12 |
| 2024/0031807 | A1 * | 1/2024 | Gundavelli ........... H04W 12/06 |
| 2024/0064208 | A1 * | 2/2024 | Kweon ................... H04L 67/30 |
| 2024/0073127 | A1 | 2/2024 | Jain et al. |
| 2024/0073692 | A1 * | 2/2024 | Srinivas ................. H04W 8/18 |
| 2024/0205205 | A1 | 6/2024 | Hou et al. |
| 2024/0235891 | A1 * | 7/2024 | Nazari ................ H04L 12/4687 |
| 2024/0314559 | A1 * | 9/2024 | Gundavelli ....... H04W 12/0433 |
| 2024/0430676 | A1 * | 12/2024 | Ma ........................ H04W 12/08 |

OTHER PUBLICATIONS

Non-Published Commonly Owned U.S. Appl. No. 18/071,536, filed Nov. 29, 2022, 55 pages, VMware, Inc.
Non-Published Commonly Owned U.S. Appl. No. 18/071,537, filed Nov. 29, 2022, 56 pages, VMware, Inc.
Non-Published Commonly Owned U.S. Appl. No. 18/071,540, filed Nov. 29, 2022, 56 pages, VMware, Inc.
Non-Published Commonly Owned U.S. Appl. No. 18/071,542, filed Nov. 29, 2022, 55 pages, VMware, Inc.
Non-Published Commonly Owned U.S. Appl. No. 18/071,543, filed Nov. 29, 2022, 54 pages, VMware, Inc.
Non-Published Commonly Owned U.S. Appl. No. 18/071,544, filed Nov. 29, 2022, 54 pages, VMware, Inc.
Non-Published Commonly Owned U.S. Appl. No. 18/071,545, filed Nov. 29, 2022, 54 pages, VMware, Inc.
Non-Published Commonly Owned U.S. Appl. No. 18/071,547, filed Nov. 29, 2022, 55 pages, VMware, Inc.
Non-Published Commonly Owned U.S. Appl. No. 18/071,549, filed Nov. 29, 2022, 54 pages, VMware, Inc.
Non-Published Commonly Owned Related U.S. Appl. No. 18/071,552 with similar specification, filed Nov. 29, 2022, 54 pages, VMware, Inc.
Non-Published Commonly Owned Related U.S. Appl. No. 18/071,553 with similar specification, filed Nov. 29, 2022, 55 pages, VMware, Inc.
PCT International Search Report and Written Opinion, PCT/US2023/031449, Nov. 20, 2023, 13 pages.

* cited by examiner

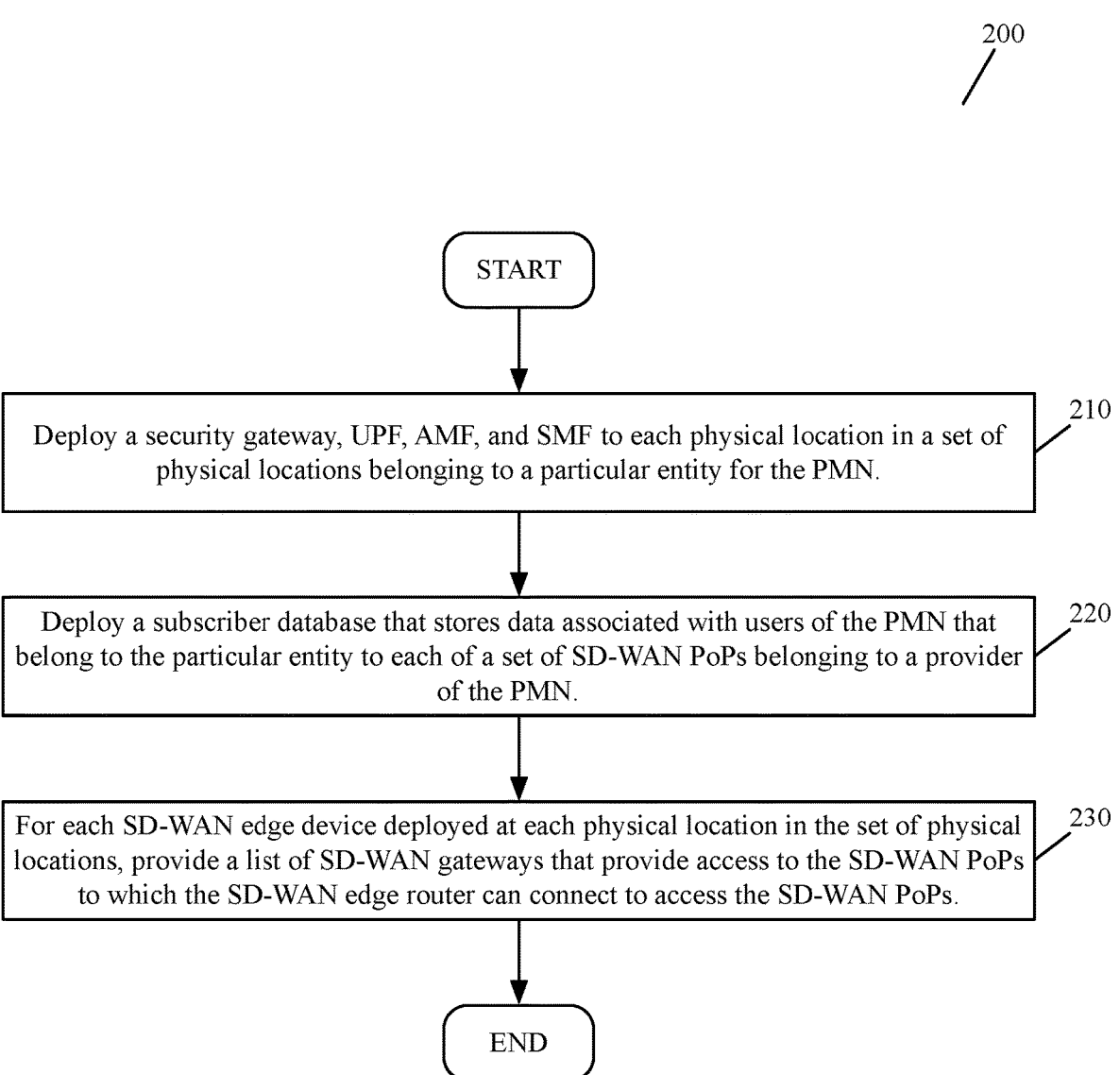

200

START

Deploy a security gateway, UPF, AMF, and SMF to each physical location in a set of physical locations belonging to a particular entity for the PMN.

210

Deploy a subscriber database that stores data associated with users of the PMN that belong to the particular entity to each of a set of SD-WAN PoPs belonging to a provider of the PMN.

220

For each SD-WAN edge device deployed at each physical location in the set of physical locations, provide a list of SD-WAN gateways that provide access to the SD-WAN PoPs to which the SD-WAN edge router can connect to access the SD-WAN PoPs.

230

END

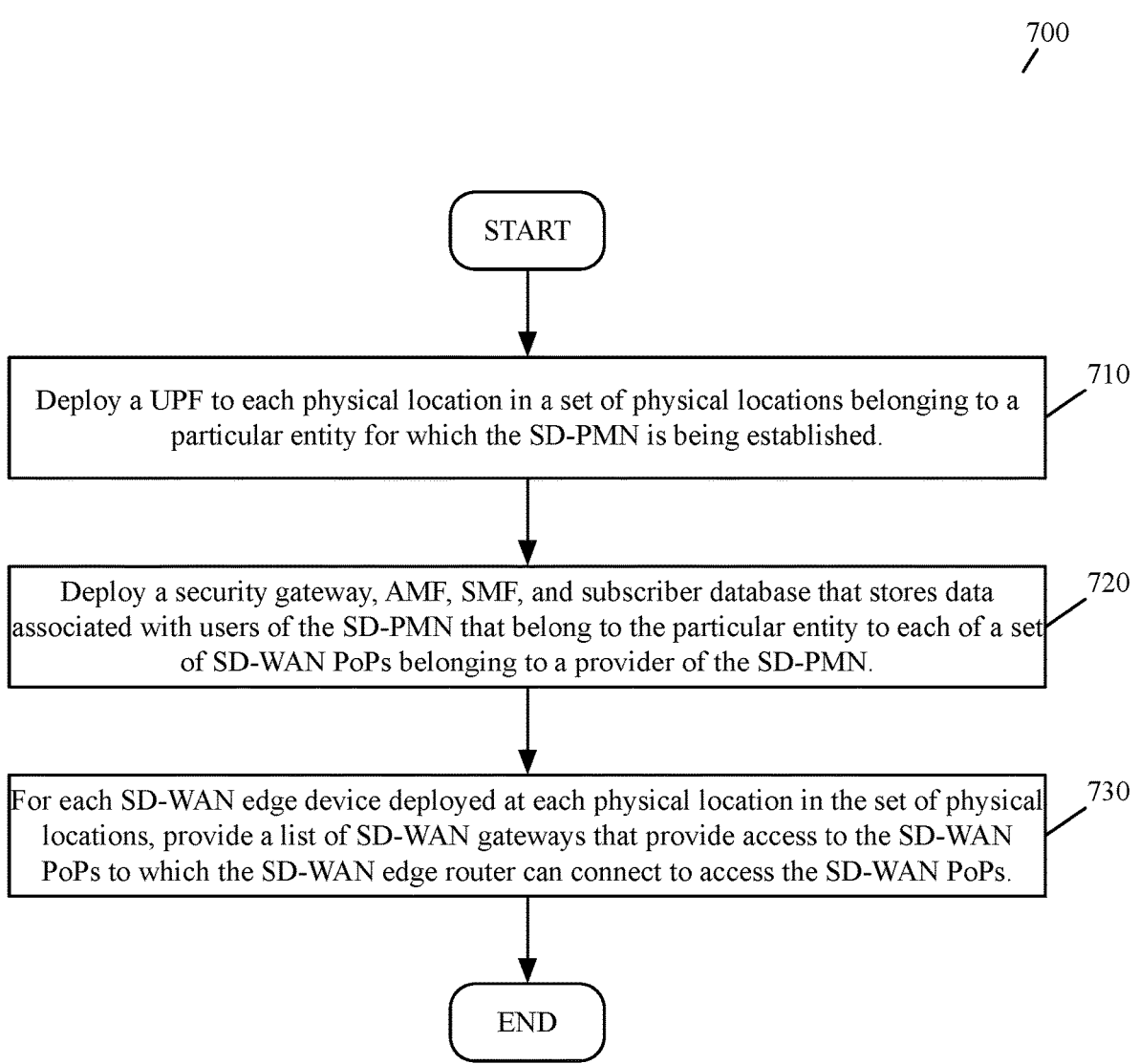

START

Deploy a UPF to each physical location in a set of physical locations belonging to a particular entity for which the SD-PMN is being established.          710

Deploy a security gateway, AMF, SMF, and subscriber database that stores data associated with users of the SD-PMN that belong to the particular entity to each of a set of SD-WAN PoPs belonging to a provider of the SD-PMN.          720

For each SD-WAN edge device deployed at each physical location in the set of physical locations, provide a list of SD-WAN gateways that provide access to the SD-WAN PoPs to which the SD-WAN edge router can connect to access the SD-WAN PoPs.          730

END

START

For each physical location spanned by the SD-PMN, receive a TAC defined for the physical location. 1410

For each data network running with the SD-PMN, receive a DNN defined for the data network. 1420

Store the received TACs and DNNs in a core of the SD-PMN. 1430

Assign TACs and DNNs to user devices as the user devices join the network. 1440

END

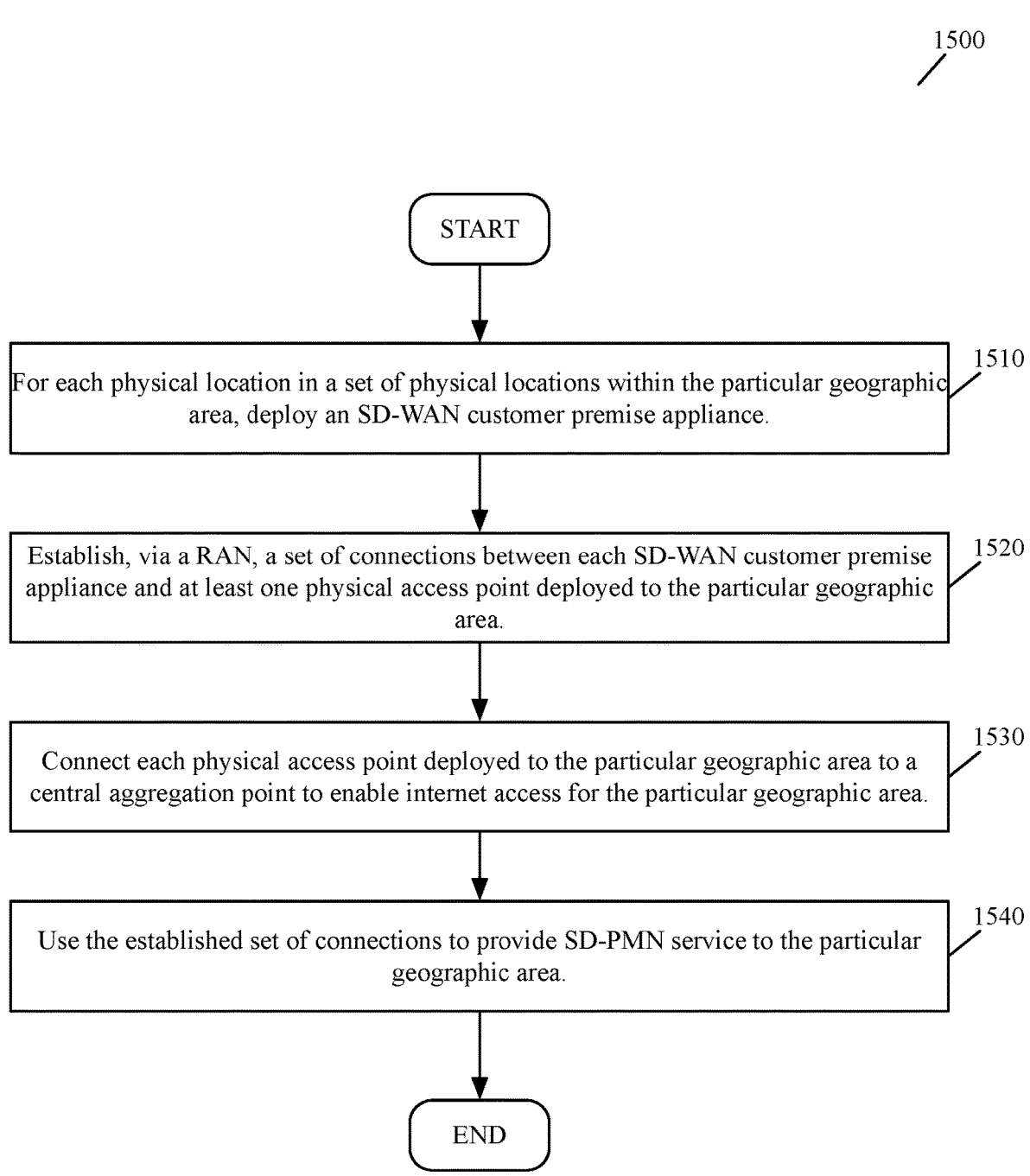

1500

START

For each physical location in a set of physical locations within the particular geographic area, deploy an SD-WAN customer premise appliance. — 1510

Establish, via a RAN, a set of connections between each SD-WAN customer premise appliance and at least one physical access point deployed to the particular geographic area. — 1520

Connect each physical access point deployed to the particular geographic area to a central aggregation point to enable internet access for the particular geographic area. — 1530

Use the established set of connections to provide SD-PMN service to the particular geographic area. — 1540

END

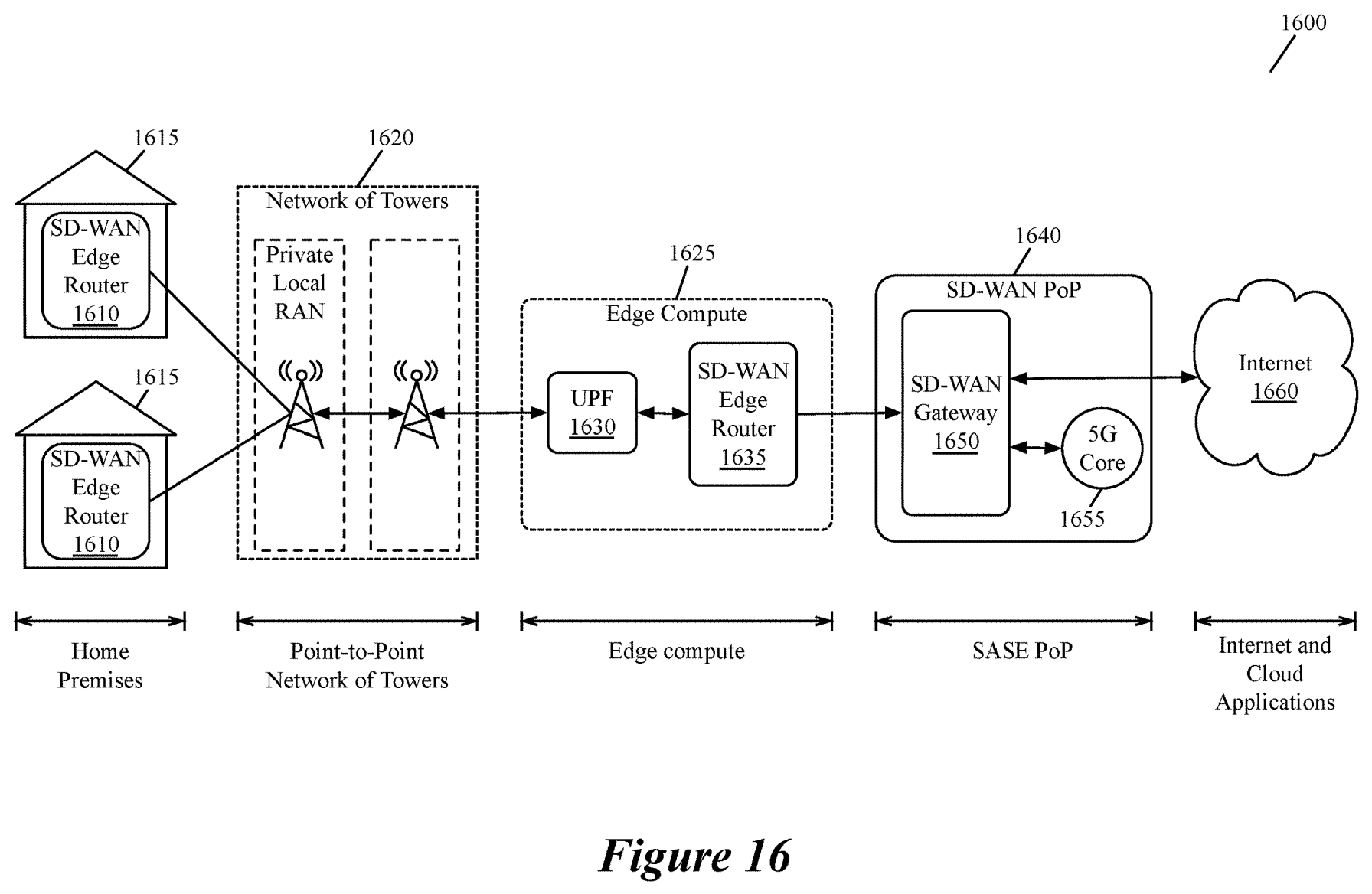

Internet
1660

Internet and
Cloud
Applications

SD-WAN PoP
1640

5G
Core
1655

SD-WAN
Gateway
1650

SASE PoP

Edge Compute
1625

SD-WAN
Edge
Router
1635

UPF
1630

Edge compute

Network of Towers
1620

Private
Local
RAN

Point-to-Point
Network of Towers

1615

SD-WAN
Edge
Router
1610

1615

SD-WAN
Edge
Router
1610

Home
Premises

*Figure 16*

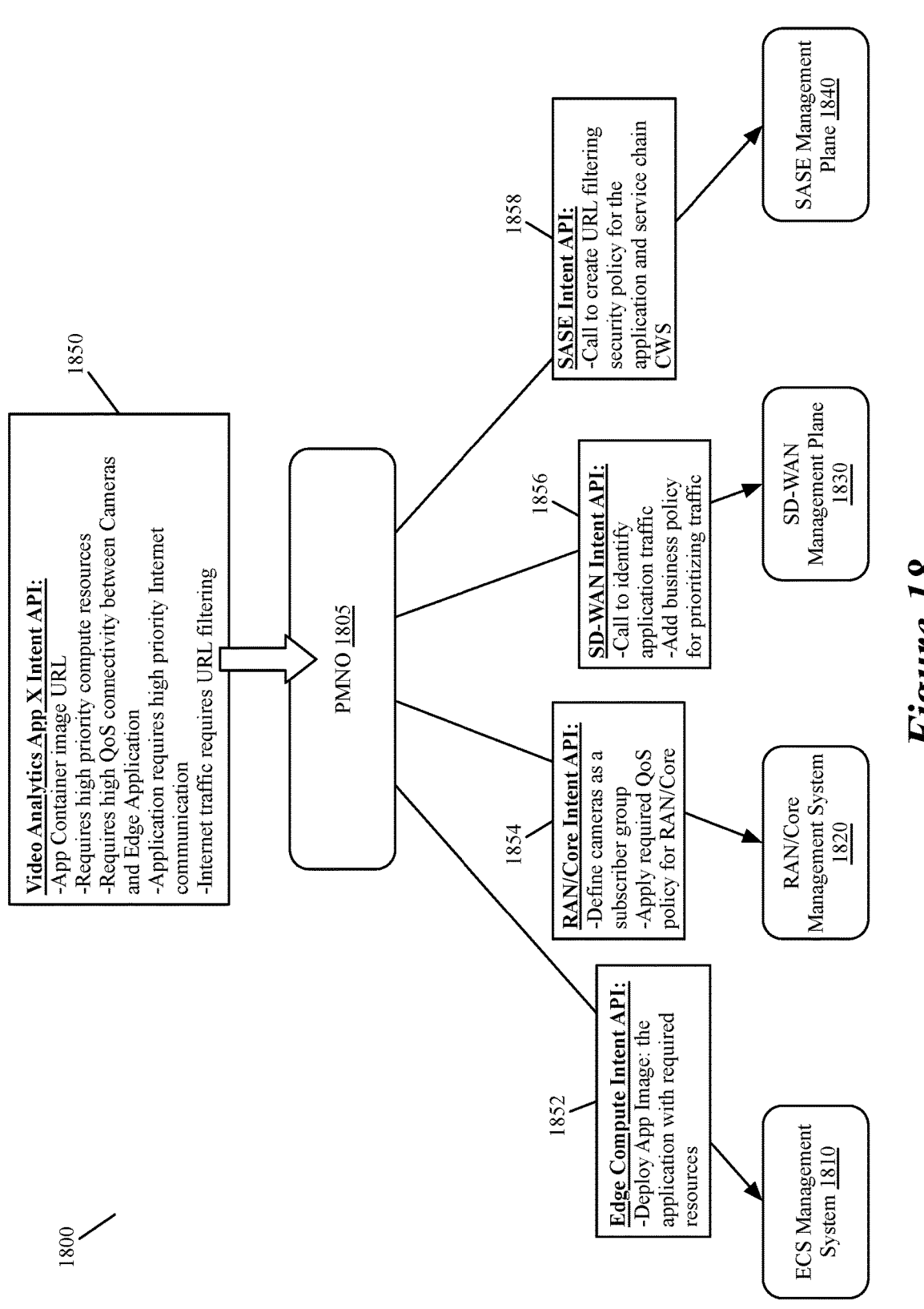

Video Analytics App X Intent API:
-App Container image URL
-Requires high priority compute resources
-Requires high QoS connectivity between Cameras and Edge Application
-Application requires high priority Internet communication
-Internet traffic requires URL filtering

1850

PMNO 1805

1858

SASE Intent API:
-Call to create URL filtering security policy for the application and service chain CWS SASE Management Plane 1840

1856

SD-WAN Intent API:
-Call to identify application traffic
-Add business policy for prioritizing traffic SD-WAN Management Plane 1830

1854

RAN/Core Intent API:
-Define cameras as a subscriber group
-Apply required QoS policy for RAN/Core RAN/Core Management System 1820

1852

Edge Compute Intent API:
-Deploy App Image: the application with required resources ECS Management System 1810

AUTHENTICATION AND AUTHORIZATION IN A PRIVATE MOBILE NETWORK

BACKGROUND

Today, Wi-Fi and other access technologies are utilized for providing private mobile networks deployed as a service for enterprise customers. However, for use cases that have more particular requirements around factors, such as coverage, reliability, and latency, these access technologies do not suffice. For these scenarios, a private mobile network based on cellular technology (e.g., 4G, 5G, etc.) is a more appropriate solution. Current approaches to such private mobile networks however have not been seamlessly integrated into proven enterprise cloud-native technologies such as Software Defined WAN (SD-WAN), Edge compute and Secure Services Edge (SSE). With an integrated architecture, other challenges emerge such as global management of dispersed network elements, methods to provide system resiliency and end-to-end quality assurance. Finally, novel modifications of the basic architectural approach can be used to cover use cases such as Fixed Wireless Access for rural areas where macro service providers to not operate.

BRIEF SUMMARY

Some embodiments of the invention provide a method implementing a software-defined private mobile network (SD-PMN) for an entity (e.g., a corporation, an educational institution, etc.). To implement the SD-PMN, the method first deploys, at a physical location of the entity, a first set of control plane components for the SD-PMN, including a security gateway, a user-plane function (UPF), an AMF (access and mobility management function), and an SMF (session management function). At an SD-WAN (software-defined wide area network) PoP (point of presence) belonging to a provider of the SD-PMN, the method deploys a second set of control plane components for the SD-PMN, the second set of control plane components comprising a subscriber database that stores data associated with users of the SD-PMN. The method uses an SD-WAN edge router located at the physical location of the entity and a SD-WAN gateway located at the SD-WAN PoP to establish a connection (e.g., via a set of physical network links) from the physical location of the entity to the SD-WAN PoP.

In some embodiments, the security gateway is configured to establish an IPsec (Internet protocol security) tunnel with each access point in a set of access points deployed in the physical location. The access points, in some embodiment, provide a connection between user devices operating in the physical location and the SD-PMN. In some embodiments, the access points receive data message traffic from the user devices as radio waves and convert the radio waves to bits and bytes which are encapsulated and sent to the security gateway via the IPsec tunnels. The security gateway forwards the encapsulated traffic to the UPF, in some embodiments, which decapsulates the traffic and forwards the decapsulated traffic as IP (Internet protocol) traffic to the SD-WAN edge routers.

The connection established by the SD-WAN edge router with the SD-WAN gateway at the SD-WAN PoP is a DMPO (dynamic multipath optimization) tunnel, according to some embodiments, that is established over a set of physical network links (e.g., MPLS, cable modem, 5G, etc.). In some embodiments, the SD-WAN edge router is one of multiple SD-WAN edge routers at multiple physical locations (e.g., branch sites) of the entity, and the SD-WAN gateway is one of multiple SD-WAN gateways at multiple SD-WAN PoPs that each include an instance of the second set of control plane components. Each SD-WAN edge router at each physical location, in some embodiments, is assigned at least a primary SD-WAN gateway associated with a first SD-WAN PoP and a secondary SD-WAN gateway associated with a second SD-WAN PoP for accessing both the internet and components of the SD-WAN PoPs.

In some embodiments, each instance of the control plane shares a same common IP address such that the common IP address can be reached at any of the multiple SD-WAN PoPs. Also, in some embodiments, the SD-PMN is a multi-tenant SD-PMN, and the common IP address associated with the control plane components at the SD-WAN PoPs is the same for all tenants receiving the SD-PMN service. By having a common IP address for the control plane components at each SD-WAN PoP, some embodiments are able to provide SD-WAN resiliency for the SD-PMN, as well as seamless failover between PoPs.

The SD-PMN is centrally managed, in some embodiments, by a private mobile network orchestrator (PMNO). In some such embodiments, the PMNO receives (e.g., from a network administrator through a user interface (UI) provided by the PMNO) for each physical location in a set of physical locations spanned by the SD-PMN, a tracking area code (TAC) defined for the physical location, as well as a data network name (DNN) defined for each data network in a set of data networks within the SD-PMN. Each data network in the set of data networks span the set of physical locations, according to some embodiments. After receiving the TACs and DNNs, the PMNO of some embodiments stores the TACs and the DNNs in a core of the SD-PMN for use in managing data message traffic and user devices in the SD-PMN.

Some embodiments of the invention also provide a method for deploying a private mobile network for an entity in particular geographic area. For each physical location in a set of physical locations within the particular geographic area (e.g., homes in a municipality), the method deploys an SD-WAN (software-defined wide area network) customer premise appliance, such as an SD-WAN edge router enabled with LTE, 4G, or 5G. The method establishes, via a RAN (radio access network), a set of connections between each SD-WAN customer premise appliance and at least one physical access point in a set of physical access points deployed in the particular geographic area. Each physical access point has a connection to a central aggregation point that includes a UPF (user plane function) and an SD-WAN edge router that connect the physical access nodes to an SD-WAN PoP (point of presence). The method then uses the established set of connections to provide a private mobile networking service for the particular geographic area.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 2 conceptually illustrates a process of some embodiments performed to implement an SD-PMN such as the SD-PMN described above for FIG. 1.

FIG. 7 conceptually illustrates a process of some embodiments for establishing an SD-PMN such as the SD-PMN illustrated in the FIG. 6.

FIG. 15 conceptually illustrates a process of some embodiments for implementing an SD-PMN as a fixed wireless network for a particular geographic location.

FIG. 16 conceptually illustrates the architecture of a fixed wireless network of some embodiments.

FIG. 18 illustrates a joint orchestration platform diagram that includes a set of example intent-based APIs for orchestrating a video analytics application, in some embodiments, across an SD-PMN, SD-WAN, and edge compute stack.

DETAILED DESCRIPTION

Figure 1:
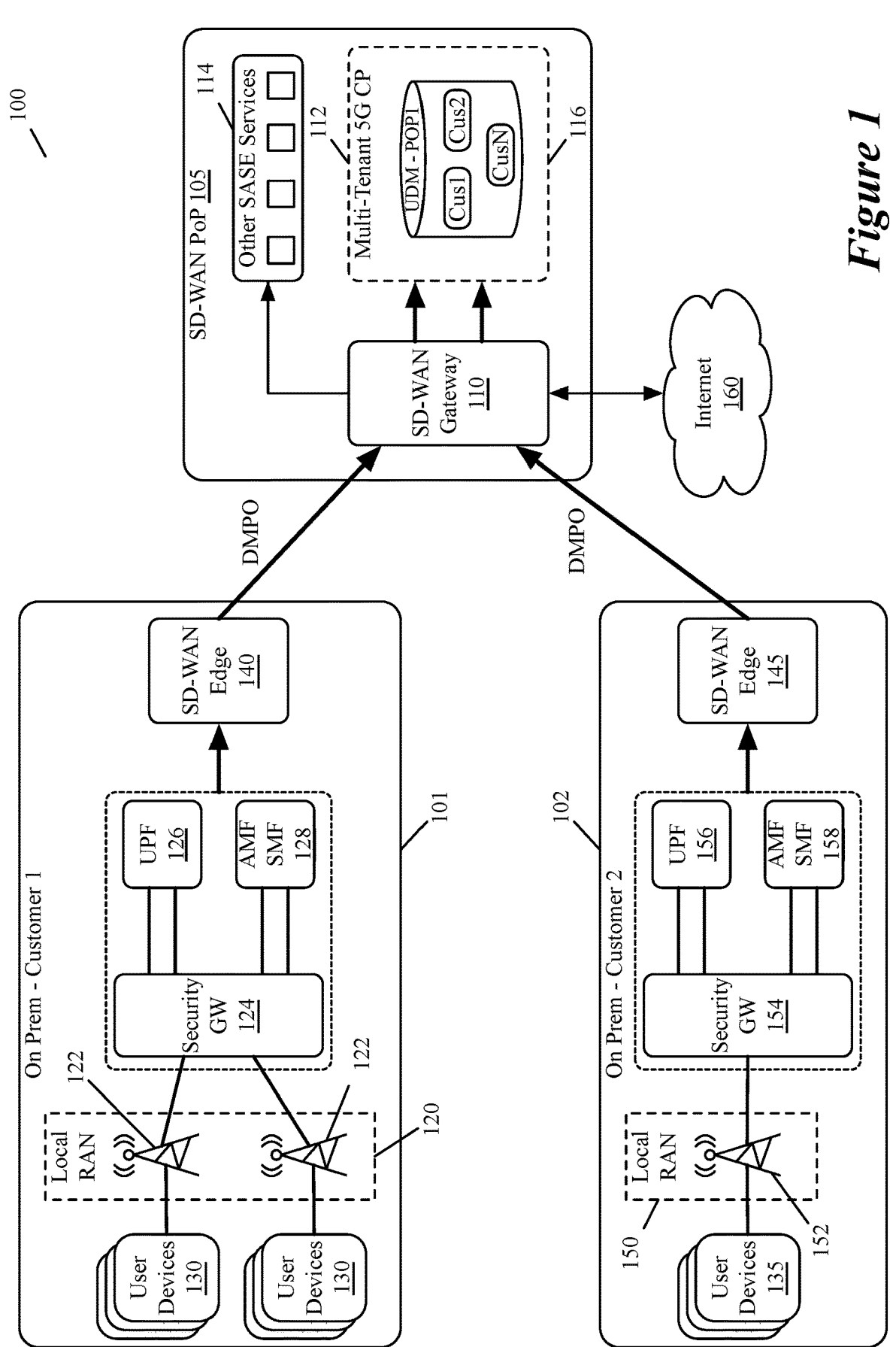
FIG. 1 conceptually illustrates a first example of an architecture diagram of a multi-tenant PMN of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method implementing a software-defined private mobile network (SD-PMN) for an entity (e.g., a corporation, an educational institution, etc.). To implement the SD-PMN, the method first deploys, at a physical location of the entity, a first set of control plane components for the SD-PMN, including a security gateway, a user-plane function (UPF), an AMF (access and mobility management function), and an SMF (session management function). At an SD-WAN (software-defined wide area network) PoP (point of presence) belonging to a provider of the SD-PMN, the method deploys a second set of control plane components for the SD-PMN, the second set of control plane components comprising a subscriber database that stores data associated with users of the SD-PMN. The method uses an SD-WAN edge router located at the physical location of the entity and a SD-WAN gateway located at the SD-WAN PoP to establish a connection from the physical location of the entity to the SD-WAN PoP.

In some embodiments, the security gateway is configured to establish an IPsec (Internet protocol security) tunnel with each access point in a set of access points deployed in the physical location. The access points, in some embodiment, provide a connection between user devices operating in the physical location and the SD-PMN. In some embodiments, the access points receive data message traffic from the user devices as radio waves and convert the radio waves to bits and bytes which are encapsulated and sent to the security gateway via the IPsec tunnels. The security gateway forwards the encapsulated traffic to the UPF, in some embodiments, which decapsulates the traffic and forwards the decapsulated traffic as IP (Internet protocol) traffic to the SD-WAN edge routers.

The connection established by the SD-WAN edge router with the SD-WAN gateway at the SD-WAN PoP is a DMPO (dynamic multipath optimization) tunnel, according to some embodiments. In some embodiments, the SD-WAN edge router is one of multiple SD-WAN edge routers at multiple physical locations (e.g., branch sites) of the entity, and the SD-WAN gateway is one of multiple SD-WAN gateways at multiple SD-WAN PoPs that each include an instance of the second set of control plane components. Each SD-WAN edge router at each physical location, in some embodiments, is assigned at least a primary SD-WAN gateway associated with a first SD-WAN PoP and a secondary SD-WAN gateway associated with a second SD-WAN PoP for accessing both the internet and components of the SD-WAN PoPs.

In some embodiments, each instance of the control plane shares a same common IP address such that the common IP address can be reached at any of the multiple SD-WAN PoPs. Also, in some embodiments, the SD-PMN is a multi-tenant SD-PMN, and the common IP address associated with the control plane components at the SD-WAN PoPs is the same for all tenants receiving the SD-PMN service. By having a common IP address for the control plane components at each SD-WAN PoP, some embodiments are able to provide SD-WAN resiliency for the SD-PMN, as well as seamless failover between PoPs.

The SD-PMN is centrally managed, in some embodiments, by a private mobile network orchestrator (PMNO). In some such embodiments, the PMNO receives (e.g., from a network administrator through a user interface (UI) provided by the PMNO) for each physical location in a set of physical locations spanned by the SD-PMN, a tracking area code (TAC) defined for the physical location, as well as a data network name (DNN) defined for each data network in a set of data networks within the SD-PMN. Each data network in the set of data networks span the set of physical locations, according to some embodiments. After receiving the TACs and DNNs, the PMNO of some embodiments stores the TACs and the DNNs in a core of the SD-PMN for use in managing data message traffic and user devices in the SD-PMN.

Some embodiments of the invention also provide a method for deploying a private mobile network for an entity in particular geographic area. For each physical location in a set of physical locations within the particular geographic area (e.g., homes in a municipality), the method deploys an SD-WAN (software-defined wide area network) customer premise appliance, such as an SD-WAN edge router enabled with LTE, 4G, or 5G. The method establishes, via a RAN (radio access network), a set of connections between each SD-WAN customer premise appliance and at least one physical access point in a set of physical access points deployed in the particular geographic area. Each physical access point has a connection to a central aggregation point that includes a UPF (user plane function) and an SD-WAN edge router that connect the physical access nodes to an SD-WAN PoP (point of presence). The method then uses the established set of connections to provide a private mobile networking service for the particular geographic area.

FIG. 1 conceptually illustrates a first example of an architecture diagram of a multi-tenant PMN of some embodiments. In this architecture diagram 100, components of the control plane are split between locations on customer premises 101 and 102 and the SD-WAN PoP 105. For instance, in this particular architecture 100, each customer premises 101 and 102 includes a security gateway 124, a UPF 126, and an AMF/SMF 128, while the SD-WAN PoP 105 includes the multi-tenant 5G unified data management (UDM) for storing user data. It should be noted that the components illustrated in the architecture in FIG. 1 are components associated with a 5G network, and other embodiments of the invention can include components associated with other network types, such as MMES (mobility management entities) for 4G and LTE solutions.

The user devices 130 and 135, in some embodiments, can include mobile telephones, tablets, computers (e.g., desktop computers, laptop computers, etc.), and any other devices belonging to users of the PMN that have the ability to connect to the internet. The access nodes 122 and 152 in the local RAN's 120 and 150 receive control plane and data plane data message traffic from the user device 130-135. The access nodes 122 and 152 are physical access points (i.e., base stations, radio units, etc.) that are part of the RAN, in some embodiments, and provide user devices with access to the PMN. For instance, for LTE (long term evolution) networks, the access nodes 122 and 152 are eNodeBs (eNBs), while for 5G networks, the access nodes 122 and 152 are gNBs (next generation NodeBs).

In some embodiments, the data message traffic is transmitted from the user devices 130 and 135 to the access nodes 122 and 152 via radio signals. Upon receiving the data message traffic from the user devices 130-135, the access nodes 122 and 152 process the data message traffic, convert the radio signals into collections of bits and bytes, encapsulate the data message traffic (i.e., the bits and bytes) and forward the encapsulated traffic to the security gateways 124 and 154 via tunnels between the access nodes 122 and 152 and the security gateways 124 and 154.

The tunnels through which the access nodes 122 and 152 forward data message traffic to the security gateways 124 and 154 are IPsec tunnels established by the security gateways 124 and 154, according to some embodiments. In some embodiments, the data message traffic is encapsulated as GPRS (general packet radio service) tunneling protocol (GTP) before being forwarded through the IPsec tunnels between the access nodes and security gateways. The security gateways 124 and 154 decapsulate the received encapsulated data message traffic, and depending on the traffic type (i.e., control traffic or dataplane traffic), forward the data message traffic as IP traffic to either their respective UPFs 126 and 156, or their respective AMFs/SMFs 128 and 158. While illustrated as a single element, it should be noted that the AMF and SMF, as will be described below, are separate functions that perform different functionalities of the control plane and in other embodiments of the invention may be illustrated separately. The UPFs 126 and 156 handle data plane traffic, according to some embodiments, while the AMFs/SMFs 128 and 158 are responsible for control plane traffic. Additional details regarding the UPFs, AMFs, and SMFs will be provided below by reference to FIGS. 4-5.

In order to send traffic to destinations external to the customer premises 101 and 102, and, in some embodiments, to certain destinations within the customer premises 101 and 102, the UPFs 126 and 156 and the AMFs/SMFs 128 and 158 forward the data message traffic to the SD-WAN edge routers 140 and 145. The SD-WAN edge routers 140 and 145 each connect to the SD-WAN gateway 110 to provide connections between the customer premises 101 and 102 and the SD-WAN PoP 105, as shown. The SD-WAN edge routers 140 and 145 of some embodiments establish DMPO tunnels to the SD-WAN gateway 110, as well as to other SD-WAN gateways (not shown), and, in some embodiments, with each other and other SD-WAN components (e.g., other SD-WAN edge routers at other physical locations of the entity, and SD-WAN hubs).

In some embodiments, once an SD-WAN edge router 140-145 detects a WAN (wide area network) link (e.g., a WAN link between the SD-WAN edge router and an SD-WAN gateway), the SD-WAN edge router 140-145 establishes a DMPO tunnel with the SD-WAN gateway 110 and run bandwidth tests using short bursts of bi-directional traffic with the SD-WAN gateway 110 (or a different SD-WAN gateway (not shown) that is closer in proximity to the SD-WAN edge router than the SD-WAN gateway 110). Because the SD-WAN gateway 110 is deployed at the SD-WAN PoP 105, the SD-WAN gateway 110 can identify real public IP addresses of WAN links in cases where a NAT (network address translation) or PAT (port address translation) device sits in front of the SD-WAN edge router, or where the WAN link is a private link, according to some embodiments.

Once the DMPO tunnels are established, in some embodiments, DMPO performs uni-directional performance metric measurements for metrics such as loss, latency, and jitter, for every data message on every DMPO tunnel between two DMPO endpoints (i.e., the SD-WAN edge routers 140-145 and the SD-WAN gateway 110). In some embodiments, the DMPO tunnel header used to encapsulate each packet sent through the DMPO tunnel includes performance metrics such as sequence number and timestamp to enable the DMPO endpoints to identify lost packets and out-of-order packets, as well as to compute jitter and latency bi-directionally. These performance metrics are communicated between the DMPO endpoints at an order of every 100 ms, according to some embodiments, and when there is no active data message traffic being sent through the DMPO tunnels, the DMPO endpoints instead send active probes every 100 ms, or every 500 ms after a certain period (e.g., 5 minutes) of no high-priority data message traffic. Additionally, for any private WAN links for which a class of service (CoS) agreement is defined, DPMO is configured in some embodiments to take the CoS agreement into account for all traffic steering decisions (e.g., monitoring traffic, data plane application traffic, etc.). DMPO can also add Forward Error Correction (FEC) for certain classes of traffic, according to some embodiments.

Once the SD-WAN gateway 110 receives data message traffic from the SD-WAN edge routers 140 and 145, the SD-WAN gateway 110 determines whether the data message traffic is application traffic or control plane traffic, and either forwards the data message traffic to the internet or to the UDM 112. In some embodiments, before forwarding internet traffic to the internet, the SD-WAN gateway 110 forwards the traffic to the SASE services 114 for processing. The SASE services 114, in some embodiments, are provided by a third-party vendor and can include services such as firewall as a service, secure web gateway, zero-trust network access, and other threat detection services.

FIG. 2 conceptually illustrates a process of some embodiments performed to implement an SD-PMN such as the SD-PMN described above for FIG. 1. The process 200 starts when the process deploys (at 210) a security gateway, UPF, AMF, and SMF to each physical location in a set of physical locations across which the SD-PMN is being deployed. Each physical location of the entity also includes a SD-WAN edge router deployed to the physical location in order to provide a connection between the physical location and SD-WAN PoPs of the provider of the SD-PMN, as well as between the physical location and other physical locations and hub datacenters of the entity. As mentioned above, the SD-WAN edge routers and SD-WAN gateways utilize SD-WAN services such as DMPO, in some embodiments, to optimize the data message traffic sent between SD-WAN devices implemented in the SD-PMN.

The process 200 deploys (at 220) a subscriber database (i.e., UDM) that stores data associated with users of the PMN that belong to the particular entity for which the PMN is being deployed to each of a set of SD-WAN PoPs belonging to a provider of the PMN. For instance, in the architecture diagram 100 described above, the UDM 112 is located in the PoP 105 while the security gateways 124 and 154, UPFs 126 and 156, and AMFs/SMFs 128 and 158 are located on the customer premises 101 and 102. The user data stored by the UDM, in some embodiments, includes customer profile information, customer authentication information, and, in some embodiments, a set of encryption keys for the information. As the UDM (i.e., instances of the UDM) is deployed to each PoP, the SD-WAN edge routers can connect to any SD-WAN gateway for any of the SD-WAN PoPs.

Figure 3:
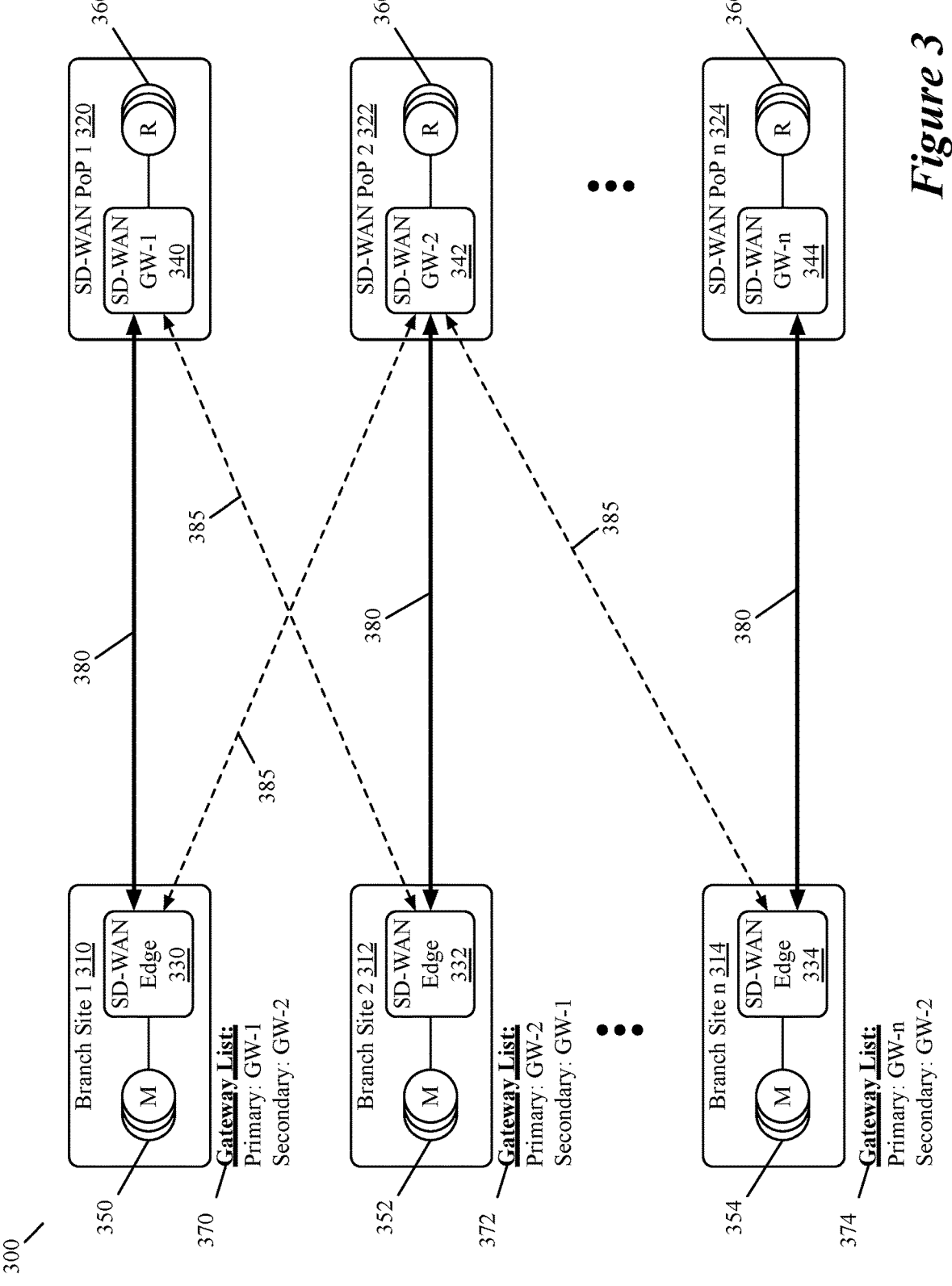
FIG. 3 conceptually illustrates a SD-PMN of some embodiments that includes multiple branch sites and multiple SD-WAN PoPs.

For each SD-WAN edge router deployed at each physical location in the set of physical locations across which the SD-PMN is being deployed, the process 200 provides a list of SD-WAN gateways to which the SD-WAN edge router can connect to access elements of the SD-WAN PoP. For example, FIG. 3 conceptually illustrates a SD-PMN 300 that includes multiple branch sites 310, 312, and 314 and multiple SD-WAN PoPs 320, 322, and 324. Each branch site 310-314 includes a respective SD-WAN edge router 330, 332, and 324 and set of machines 350, 352, and 354 (e.g., user devices and other network devices deployed to the branch sites), as shown. Each of the SD-WAN PoPs 320-324 includes a respective SD-WAN gateway 340, 342, and 344, and a set of resources 360, which are the same for each SD-WAN PoP.

Each of the branch sites 310-314 includes a respective gateway list 370, 372, and 374 provided to the SD-WAN edge routers 330-334 for use in connecting their respective branch sites 310-314 to resources 360 located in the PoPs 320-324, with each gateway list 370-374 including a primary gateway and a secondary gateway. Accordingly, each of the SD-WAN edge routers 330-334 has established a connection (e.g., DMPO tunnel) 380 to their primary SD-WAN gateways and a connection 385 to their secondary SD-WAN gateways. As will be described in the embodiments further below, the secondary gateways are for use by the SD-WAN edge routers 330-334 for failover. Returning to the process 200, after the gateway lists have been provided to the SD-WAN edge routers, the process 200 ends.

Figure 4:
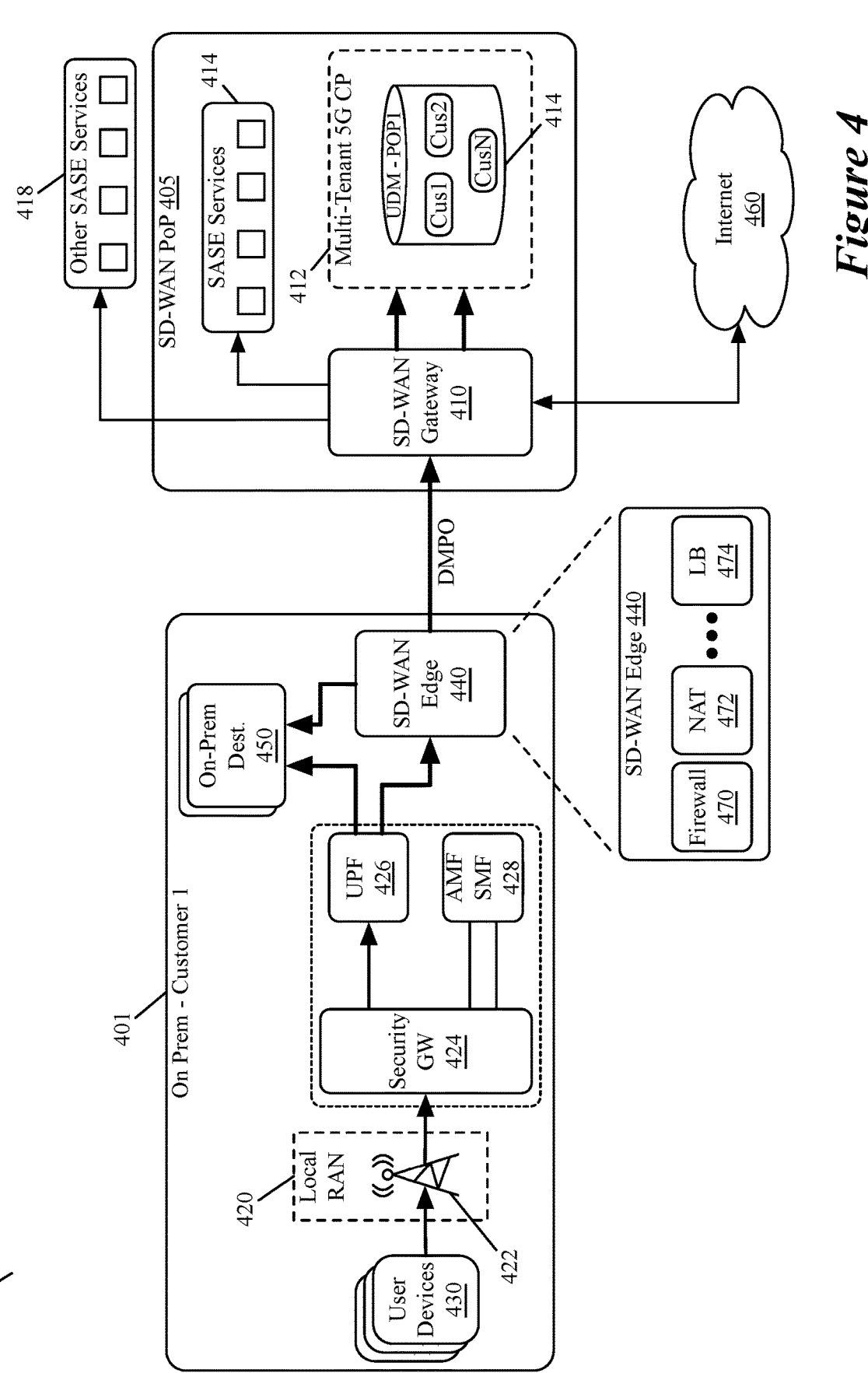
FIG. 4 conceptually illustrates an architecture diagram showing a data plane flow through an SD-PMN of some embodiments.

As mentioned above regarding the architecture diagram 100 of FIG. 1, the UPFs 126 and 156 handle data plane traffic, while the AMFs/SMFs 128 and 158 are responsible for control plane traffic. FIG. 4 conceptually illustrates an architecture diagram showing a data plane flow through an SD-PMN of some embodiments. The diagram 400 includes a customer premises 401 and an SD-WAN PoP 405. The customer premises 401 includes user devices 430, a local RAN 420 that includes at least one access node 422, a security gateway 424, a UPF 426, an AMF/SMF 428, an SD-WAN edge 440, and on-premise destinations 450. The SD-WAN PoP 405 includes an SD-WAN gateway 410, a multi-tenant 5G UDM 412, and SASE services 414.

For user devices 430 that are already authenticated with the SD-PMN, the data message traffic sent from these devices is transmitted via radio waves from the user devices 430 to the access nodes 422 that are part of the local RAN 420. The access node 422 processes the received data message traffic radio waves and converts the radio waves into bits and bytes, and encapsulates the data to be transmitted to the security gateway 424 via an IPsec tunnel established by the security gateway 424 between the access node 422 and security gateway 424. When the data message traffic (i.e., the encapsulated bits and bytes) arrives at the security gateway 424, the security gateway 424 decapsulates the traffic and forwards the decapsulated traffic to the UPF 426. In some embodiments, the decapsulated traffic is GTP traffic.

When the UPF 426 receives the GTP traffic from the security gateway 424, the UPF 426 then removes the GTP header from the data message traffic and sends the data message traffic out as IP traffic. In some embodiments, data messages having destinations within the customer premises 401 are sent directly from the UPF 426 to their intended destinations. In other embodiments, the UPF 426 sends the data message traffic to the SD-WAN edge router 440, which then forwards the data message traffic to, e.g., an on-premise destination 450. Similarly, for data message traffic associated with destinations external to the customer premise 401, such as the SD-WAN PoP 405, the UPF 426 forwards the data message traffic to the SD-WAN edge router 440, which forwards the traffic to a next-hop forwarding elements, such as the SD-WAN gateway 110 through a DMPO tunnel established between these endpoints, which provides access to the SD-WAN PoP 405, and also forwards traffic having destinations external to the SD-PMN, such as the internet 460.

The SD-WAN gateway 410, in some embodiments, determines whether the received data message traffic requires processing by, e.g., the SASE services 414, or any other packet processing pipelines deployed to the SD-WAN PoP 405 (e.g., middlebox service engines). For data message traffic that does require processing by the SASE services 414, or other processing performed within the SD-WAN PoP 405, the SD-WAN gateway 410 forwards the data message traffic for processing, and then subsequently forwards the processed data message traffic to its destination, such as via the internet 460.

Figure 5:
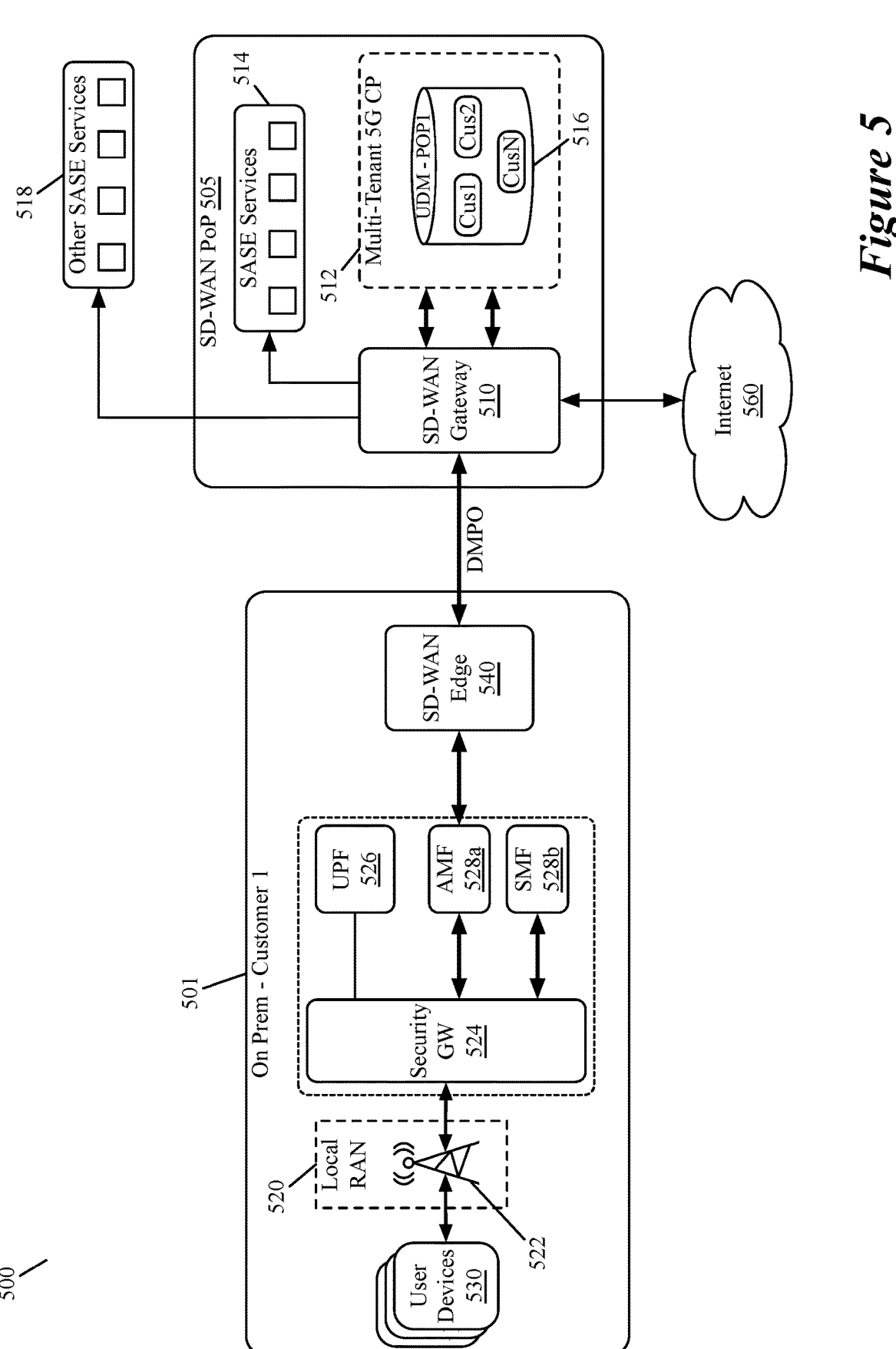
FIG. 5 conceptually illustrates an architecture diagram showing a control plane flow through an SD-PMN of some embodiments.

FIG. 5 conceptually illustrates an architecture diagram showing a control plane flow through an SD-PMN of some embodiments. Like the diagram 400, the diagram 500 includes a customer premises 501 and an SD-WAN PoP 505. The customer premises 501 includes user devices 530, a local RAN 520 that includes at least one access node 522, a security gateway 524, a UPF 526, an AMF 528, an SMF 528*b*, and an SD-WAN edge 540. The SD-WAN PoP 505 includes an SD-WAN gateway 510, a multi-tenant 5G UDM 512, and SASE services 514.

When a user device 530 attempts to connect to the SD-PMN, the user device 530 tries to associate with an access node 522 that is part of the local RAN 520 to request to join the network, according to some embodiments. The access node 522 then communicates with the security gateway 524 with the intention of the communications reaching the AMF 528*a*. The AMF 528*a* is responsible for authenticating the user device 530. In some embodiments, the AMF 528*a* performs the user authentication by performing a look-up in a database that stores user information to determine who is trying to join the network, as well as what type of service should be provided to the user device 530 upon authentication.

Accordingly, the AMF 528*a* sends a control message (e.g., an authentication request) destined to an IP address associated with the UDM 512 to the SD-WAN edge router 540, which sends the control messages via a DMPO tunnel to the SD-WAN gateway 510 at the SD-WAN PoP 505 that hosts the UDM 512. The IP address associated with the UDM 512 is a common IP address at every single SD-WAN PoP connected by the SD-PMN, according to some embodiments. Additional details regarding the use of a common IP address for each SD-WAN PoP will be described in further detail by reference to embodiments below.

Upon receiving the authentication request, the UDM 512 performs user authentication by identifying in its database which user is trying to join based on an identifier associated with the user, whether the user is authorized to join the network, as well as the kind of service should be provided to the user if the user is authenticated. For user devices that are not authorized, the UDM 512 indicates to the AMF 528*a* that the device is not authorized, and the AMF 528*a* subsequently provides that response back to the unauthorized user device. Otherwise, when the UDM 512 determines that the user is allowed to join the network, the UDM 512 sends a reply to the AMF 528*a* that indicates that the user device 530 is authorized to use the network and provides any necessary information about the user and/or user device.

In response to a user device 530 being authorized, the SMF 528*b* then communicates with the UPF 526 to direct the UPF 526 to set up a bearer for the newly authorized user device 530. The UPF 526 then provides the user device with an IP address, enables a particular QoS (quality of service) for the user device's communications, and indicates which subnets (e.g., VLANs) to put the user device's traffic on. In some embodiments, when applicable, the SMF 528*b* directs the UPF 526 to also create certain network slices for the newly authorized user device. Once the UPF 526 has completed these steps, the user device 530 can communicate using the SD-PMN.

Figure 6:
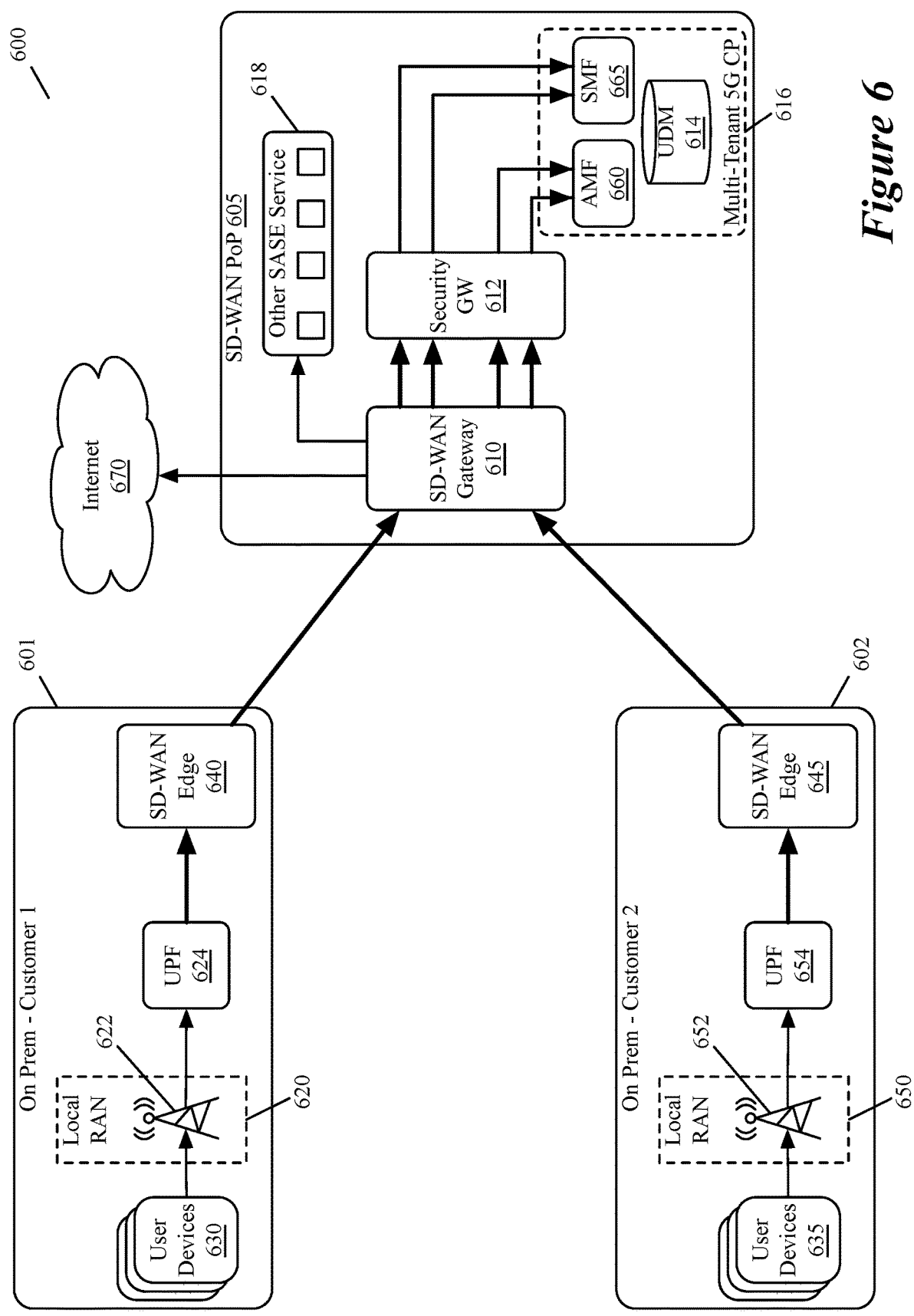
FIG. 6 conceptually illustrates a second example of an architecture diagram of a multi-tenant PMN of some embodiments.

In some embodiments, a different control plane architecture is utilized for implementing an SD-PMN. FIG. 6 conceptually illustrates a second example of an architecture diagram of a multi-tenant PMN of some embodiments. The architecture diagram 600 includes customer premises 601 and 602 for first and second customers respectively, as well as an SD-WAN PoP 605. Each customer premises 601 and 602 includes respective user devices 630 and 635, a local RAN 620 and 650 that includes at least one access node 622 and 652, a UPF 624 and 654, and an SD-WAN edge router 640 and 645. The SD-WAN PoP 605 includes an SD-WAN gateway 610, SASE services 618, a security gateway 612, and a multi-tenant control plane 616 that includes an AMF 660, SMF 665, and UDM 614. That is, unlike the embodiments described above, the security gateway, AMF, and SMF are deployed to the PoPs rather than to each customer premise. The architecture diagram 600 will be described in more detail below by reference to FIG. 7.

FIG. 7 conceptually illustrates a process of some embodiments for establishing an SD-PMN such as the SD-PMN illustrated in the diagram 600. The process 700 starts when the process deploys (at 710) a UPF to each physical location in a set of physical locations belonging to a particular entity for which the SD-PMN is being established. The UPF 624 and 654 operates as an interconnecting point between the local RAN 620 and 650 and components of the data network (e.g., the SD-WAN edge router 640 and 645), performs routing and forwarding for data messages sent on the control plane and data plane, and performs various other functions such as setting up bearers for newly authorized user devices. For instance, because the AMF 660 and SMF 665 are deployed to the SD-WAN PoP 605 instead of to each customer premise 601 and 602, the UDF 624 and 654 receives and forwards control data messages, such as requests from new user devices looking to access the SD-PMN.

When a new user device attempts to access the SD-PMN, the request is received by the access point 622 and 652 that is part of the local RAN 620 and 650, which converts the request from radio waves to bits and bytes, encapsulates the converted request, and forwards the encapsulated request via a GTP tunnel to the UPF 624 and 654. The UPF 624 and 654 sends the request as IP traffic to the SD-WAN edge router 640 and 645, which forwards the request via a DMPO tunnel between the SD-WAN edge router 640 and 645 and the SD-WAN gateway 610. The SD-WAN gateway 610 forwards the request to the security gateway 612, which provides the request to the multi-tenant 5G control plane 616.

Returning to the process 700, the process deploys (at 720) a security gateway, AMF, SMF, and subscriber database that stores data associated with users of the SD-PMN that belong to the particular entity (an any other entity that uses the multi-tenant SD-PMN) to each of a set of SD-WAN PoPs belonging to a provider of the SD-PMN. That is, rather than just deploying the UDM 614 to the SD-WAN PoPs 605, the AMF 660 and SMF 665 are also deployed to the SD-WAN PoPs 605. As such, to continue to process an authentication request for a new user, the security gateway 612 provides the request to the AMF 660 that is deployed to the multi-tenant 5G control plane 616.

Upon received an authentication request, the AMF 660 performs a lookup in the UDM 614 to determine whether the requesting device is allowed to access the SD-PMN. For requesting devices that are not authorized, the AMF 660 sends a response back to the UPF 624 and 654 via the security gateway 612, SD-WAN gateway 610, and SD-WAN edge 640 and 645, which then notifies (i.e., via the local RAN 620 and 650) that the device is not authorized to access the SD-PMN. For devices that are authorized, the SMF 665 then communicates with the UPF 624 and 654 to direct the UPF to set up a bearer for the newly authorized and authenticated user device by providing the user device with an IP address, enabling a particular QoS for the user device's communications, and indicating which subnet(s) to put the user device's traffic on.

For each SD-WAN edge device deployed at each physical location in the set of physical locations, the process 700 provides (at 730) a list of SD-WAN gateways that provide access to the SD-WAN PoPs to which the SD-WAN edge router can connect to access the SD-WAN PoPs. While only one SD-WAN gateway 610 at one SD-WAN PoP 605 is illustrated in the diagram 600, other embodiments of the invention include multiple SD-WAN PoPs each having a respective SD-WAN gateway. Each SD-WAN edge router at each branch site (i.e., customer premise) then receives a list indicating at least a primary and secondary SD-WAN gateway for the SD-WAN edge router to connect to in order to access services and components of the SD-WAN PoPs, such as the control plane deployed to the PoPs. Following 730, the process 700 ends.

Figure 8:
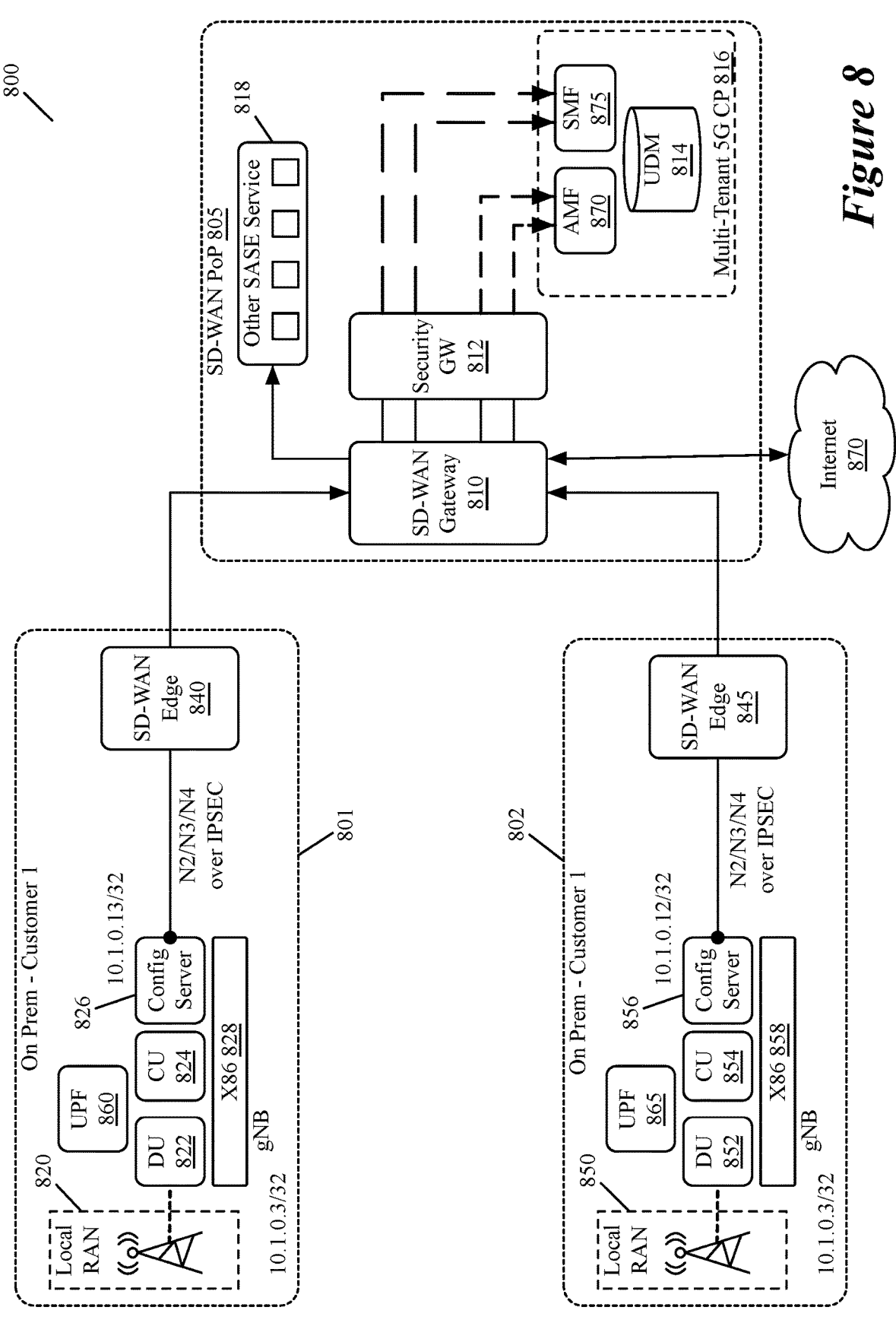
FIG. 8 conceptually illustrates an architecture diagram in which a multi-tenant SD-PMN is implemented across customer premises of some embodiments that have a disaggregated RAN.

The distributed control plane architecture described above for FIG. 6 is applicable for both small cell and disaggregated RANs, according to some embodiments. FIG. 8 conceptually illustrates an architecture diagram in which a multi-tenant SD-PMN is implemented across customer premises of some embodiments that have a disaggregated RAN. As shown, the diagram 800 includes two customer premises 801 and 802 and an SD-WAN PoP 805. The SD-WAN PoP 805 includes an SD-WAN gateway 810, security gateway 812, multi-tenant 5G control plane 816, and SASE services 818. Similar to the diagram 600, the multi-tenant 5G control plane 816 includes a UDM 814, an AMF 860, and an SMF 865. Each customer premises 801 and 802 includes a respective local RAN 820 having at least one access point, a distributed unit (DU) 822 and 852, a central unit (CU) 824 and 854, a configuration server 826 and 856, X86 microprocessors 828 and 858, a UPF 860 and 865, and an SD-WAN edge router 840 and 845.

On each customer premise 801 and 802, the local RANs 820 and 850 act as the radio units (RUs) for the disaggregated RAN and enable geographical coverage using radio functions. The DUs 822 and 852 realize baseband processing functions across the different physical locations spanned by the SD-PMN as virtualized network functions that run on hardware, and allow for possible hardware acceleration. The CUs 824 and 854 centralize data message processing functions, and, like the DUs, realize these functions as virtualized network functions that run on hardware. The configuration servers 826 and 856 receive configuration data for the disaggregated RAN from a manager (e.g., management server) for the SD-PMN.

When a new user device attempts to access the SD-PMN, the user device communicates via radio waves with the local RAN 820 and 850, which converts the radio waves to bits and bytes, encapsulates the bits and bytes, and transmits the encapsulated bits and bytes through a tunnel to the UPF 860 and 865. The UPF 860 and 865 then transmit the authentication request to the SD-WAN edge router 840 and 845 as IP traffic, and the SD-WAN edge router 840 and 845 uses the DMPO tunnel to the SD-WAN gateway 810 to forward the request to the SD-WAN PoP 805.

The AMF 870 performs a look-up with the UDM 814 to determine whether the requesting user device is authorized to use the SD-PMN. For devices that are not authorized, the AMF 870 sends a response back toward the UPF 860 to indicate the requesting device is not authorized, and the UPF 860 notifies the requesting device that the request is denied. For devices that are authorized, the SMF 875 then communicates with the UPF 860 to have the UPF 860 set up a bearer for the new user device to enable the new user device to use the SD-PMN. The UPF 860 and 865 then provides the user device with an IP address, enables a particular QoS (quality of service) for the user device's communications, and indicates which subnets (e.g., VLANs) to put the user device's traffic on.

It should be noted that in the embodiments described above and below that for the core network, the data plane components are located on customer premises, the control plane components are split between customer premises and the SD-WAN PoPs, and, as will be described below, the management plane components are centrally located in the cloud. Additionally, for the RAN, the data plane components and control plane components are located on customer premises, and the management plane components are centrally located it the cloud (or multiple clouds such as in the case of multiple RAN vendors as will be described further below). As will be described in some embodiments below, the core network management plane components and the RAN management plane components of some embodiments are located in separate clouds that connect to a unified and centralized management system for the SD-PMN.

Figure 9:
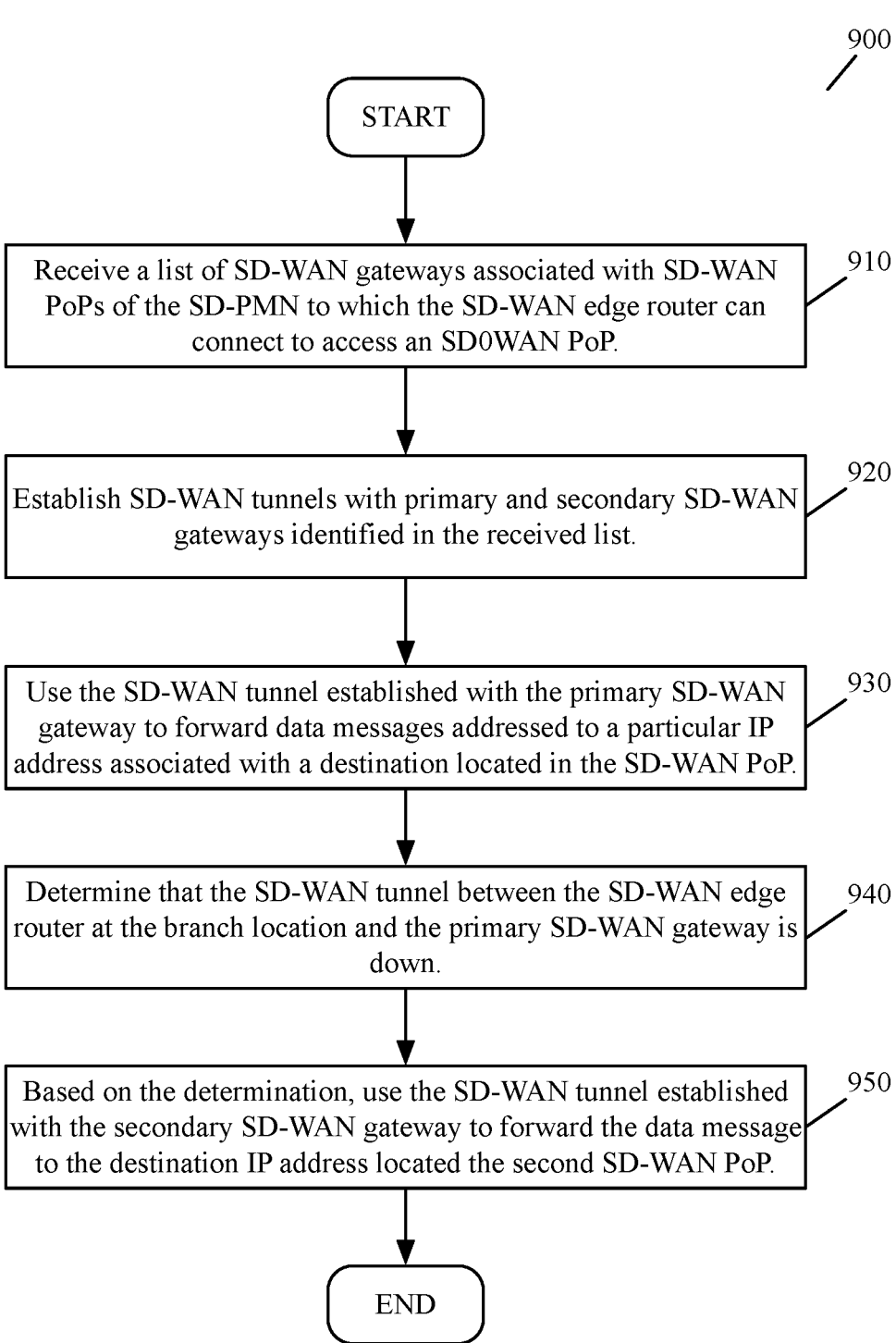
FIG. 9 conceptually illustrates a failover process performed by an SD-WAN edge router of some embodiments when connecting to an SD-WAN PoP.
Figure 10:
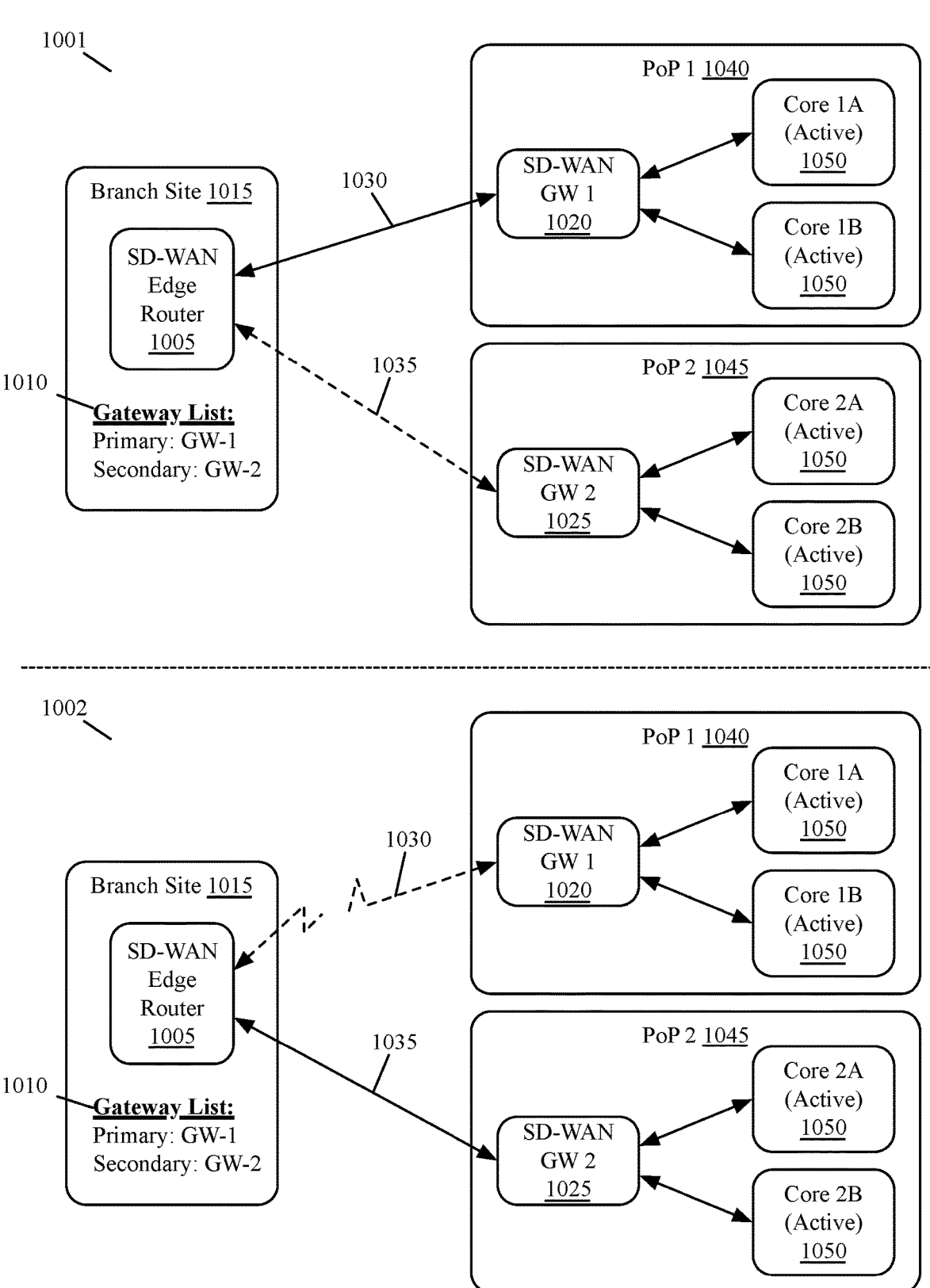
FIG. 10, which conceptually illustrates a set of diagrams showing failover from a first PoP to a second PoP.

In some embodiments, the IP address assigned to the control plane components (i.e., the control plane components for the core network) deployed to the SD-WAN PoPs is a common IP address that is used for those components across all of the PoPs, regardless of location or customer. In other words, all of the control plane components for the multi-tenant SD-PMN are reachable at the same IP address in each SD-WAN PoP. As a result, the SD-PMN is able to provide resiliency and seamless failover between SD-WAN PoPs. FIG. 9 conceptually illustrates a failover process performed by an SD-WAN edge router of some embodiments when connecting to an SD-WAN PoP. The process 900 will be described in detail below with references to FIG. 10, which conceptually illustrates a set of diagrams showing failover from a first PoP to a second PoP.

The process 900 starts when the SD-WAN edge router receives (at 910) a list of SD-WAN gateways associated with SD-WAN PoPs of the SD-PMN to which the SD-WAN edge router can connect to access an SD-WAN PoP. In some embodiments, when the SD-PMN is established, each SD-WAN edge router at each branch location of an entity for which the SD-PMN is implemented receives a gateway list that specifies at least a primary SD-WAN gateway and secondary SD-WAN gateway to which the SD-WAN edge router can connect to access an SD-WAN PoP. In the diagrams 1001 and 1002, for instance, the SD-WAN edge router 1005 at the branch site 1015 is illustrated as having a gateway list 1010 specifying gateway 1 1020 as a primary gateway and gateway 1025 as a secondary gateway. In some embodiments, the gateway lists are determined based on proximity of the gateways to the SD-WAN edge router (i.e., the primary gateway being the closest gateway to the edge router).

The process 900 establishes (at 920) SD-WAN tunnels with primary and secondary SD-WAN gateways identified in the received list. In the diagram 1001, the SD-WAN edge router 1005 has a first tunnel 1030 to its primary SD-WAN gateway 1020 and a second tunnel 1035 to its secondary SD-WAN gateway 1025 (drawn with a dashed line to indicate it is the tunnel to the secondary gateway).

The process 900 uses (at 930) the SD-WAN tunnel established with the primary SD-WAN gateway to forward data messages addressed to a particular IP address associated with the control plane components (i.e., core) located in the SD-WAN PoP. As illustrated in the diagrams 1001 and 1002, each both the first PoP 1040 and the second PoP 1045 include two active instances of the core 1050. Each instance of the core 1050 is identical to each other instance of the core 1050, is stateless, and is reachable at the same common IP address, as described in the embodiments above. As such, in some embodiments, if one active core in a PoP becomes unavailable, the SD-WAN gateway for that PoP can auto- matically switch to the other active core for forwarding data messages associated with the common IP address assigned to the core, thereby providing resiliency and seamless failover within each PoP.

The process 900 determines (at 940) that the SD-WAN tunnel between the SD-WAN edge router at the branch location and the primary SD-WAN gateway is down. In the diagram 1002, for instance, the tunnel 1030 from the SD-WAN edge router 1005 to the SD-WAN gateway is indicated as being down. The SD-WAN tunnel between the SD-WAN edge router and the SD-WAN gateway is a DMPO tunnel, according to some embodiments. Accordingly, in some embodiments, DMPO detects the outage, or brownout (e.g., when a particular link cannot provide SLA for a particular application), while performing its continuous monitoring, and can alert the SD-WAN edge router of the tunnel failure to cause the SD-WAN edge router to use the secondary SD-WAN gateway for reaching a particular IP address in an SD-WAN PoP.

Based on the determination that the SD-WAN tunnel to the primary SD-WAN gateway is down, the process 900 uses (at 950) the SD-WAN tunnel established with the secondary SD-WAN gateway to forward the data message to the destination IP address located the second SD-WAN PoP. As illustrated in the diagram 1002, the tunnel 1035 is now shown as a solid line to indicate this tunnel is now the active tunnel being used by the SD-WAN edge router 1005 to connect its branch site 1015 to the core 1050. In some embodiments, the SD-WAN edge router 1005 continues to use the tunnel 1035 to the secondary SD-WAN gateway 1025 at the second PoP 1045 to reach the core 1050 until the tunnel 1030 is back up and running. In other embodiments, the SD-WAN edge router 1005 uses the tunnel 1035 until the tunnel 1035 experiences an outage or brownout. Following 950, the process 900 ends.

Figure 11:
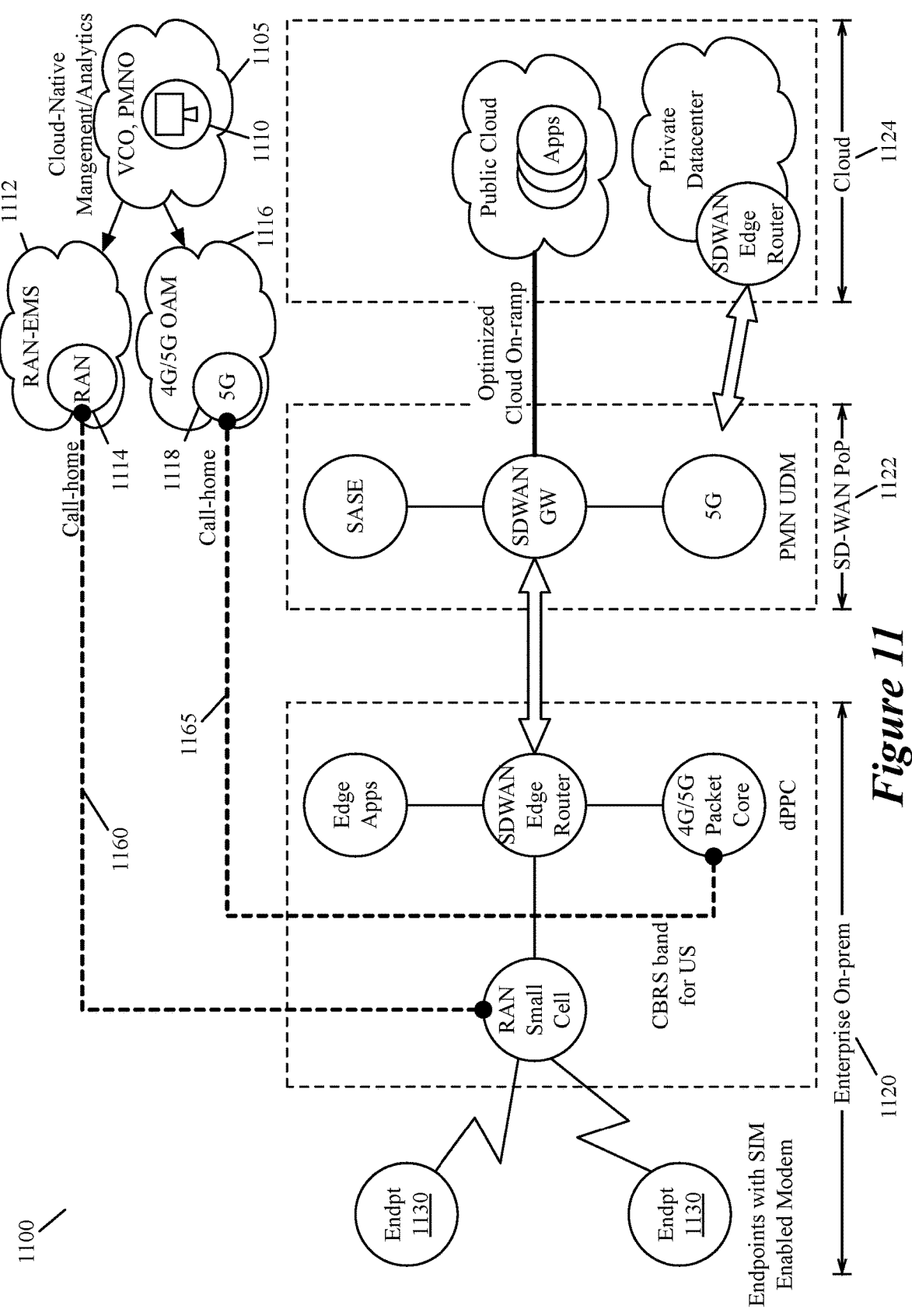
FIG. 11 conceptually illustrates a diagram of a SD-PMN having a centralized management plane, in some embodiments.

In some embodiments, the SD-PMN is managed and configured by a centralized management plane. FIG. 11 conceptually illustrates a diagram of a SD-PMN having a centralized management plane, in some embodiments. As shown, the diagram 1100 includes a central orchestrator 1110 located in a cloud 1105, one or more RAN management OAM (operations, administration, and maintenance) servers 1114 located in a cloud 1112, a 5G core OAM server 1118 located in a cloud 1116, an on-premise enterprise location 1120, an SD-WAN PoP 1122, and clouds 1124. The on- premise enterprise location 1120 includes endpoints 1130 with SIM-enabled modems, a small cell RAN 1132, edge applications 1134, an SD-WAN edge router 1136, and a 4G/5G packet core 1138. The SD-WAN PoP 1122 includes SASE services 1140, an SD-WAN gateway 1142, and a 5G core 1144 that includes the UDM for the SD-PMN. The clouds 1124 include a public cloud 1150 that hosts multiple applications 1152, and a private cloud datacenter 1154 that includes an SD-WAN edge router 1156 for connecting to the SD-WAN PoP 1122 and other elements external to the private datacenter 1154.

Because the components of the RAN and core are dis- tributed, in some embodiments, with the RAN on each customer's premises and the core split between each cus- tomers' premises and the SD-WAN PoPs of the SD-PMN provider, information associated with each portion of the RAN and core needs to be centralized into one management layer in order for, e.g., certain parameters to be assigned. Accordingly, the PMNO 1110, in some embodiments, cen- trally stores tenant-specific 5G core and access point (i.e., RAN) information and pushes this information to respective OAM servers 1114 and 1118 as configuration updates are made. In some embodiments, the OAM servers 1114 and 1118 are deployed across multiple administrative domains in one or more public clouds. Also, in some embodiments, the PMNO 1110 is configured to support multiple RAN vendors, including multiple RAN vendors for a single customer premise. In some such embodiments, the PMNO 1110 invokes vendor-specific APIs against the corresponding RAN OAM server based on both the type of access point associated and the site at which that access point is deployed.

In some embodiments, all sessions between the on-prem- ise components, such as the RAN 1132 and 4G/5G packet core 1138, and their respective OAM servers in the cloud(s), such as the RAN OAM server(s) 1114 located in the cloud 1112 and 5G core server 1118 located in the cloud 1116, are initiated by the on-premise components rather than by the cloud components. That is, the cloud components will not establish new connections, according to some embodiments. Additionally, the connection 1160 between the RAN 1132 and RAN OAM server(s) 1114, and the connection 1165 between the 4G/5G packet core 1138 and 5G core OAM 1118 are encrypted connections, according to some embodi- ments.

Figure 12:
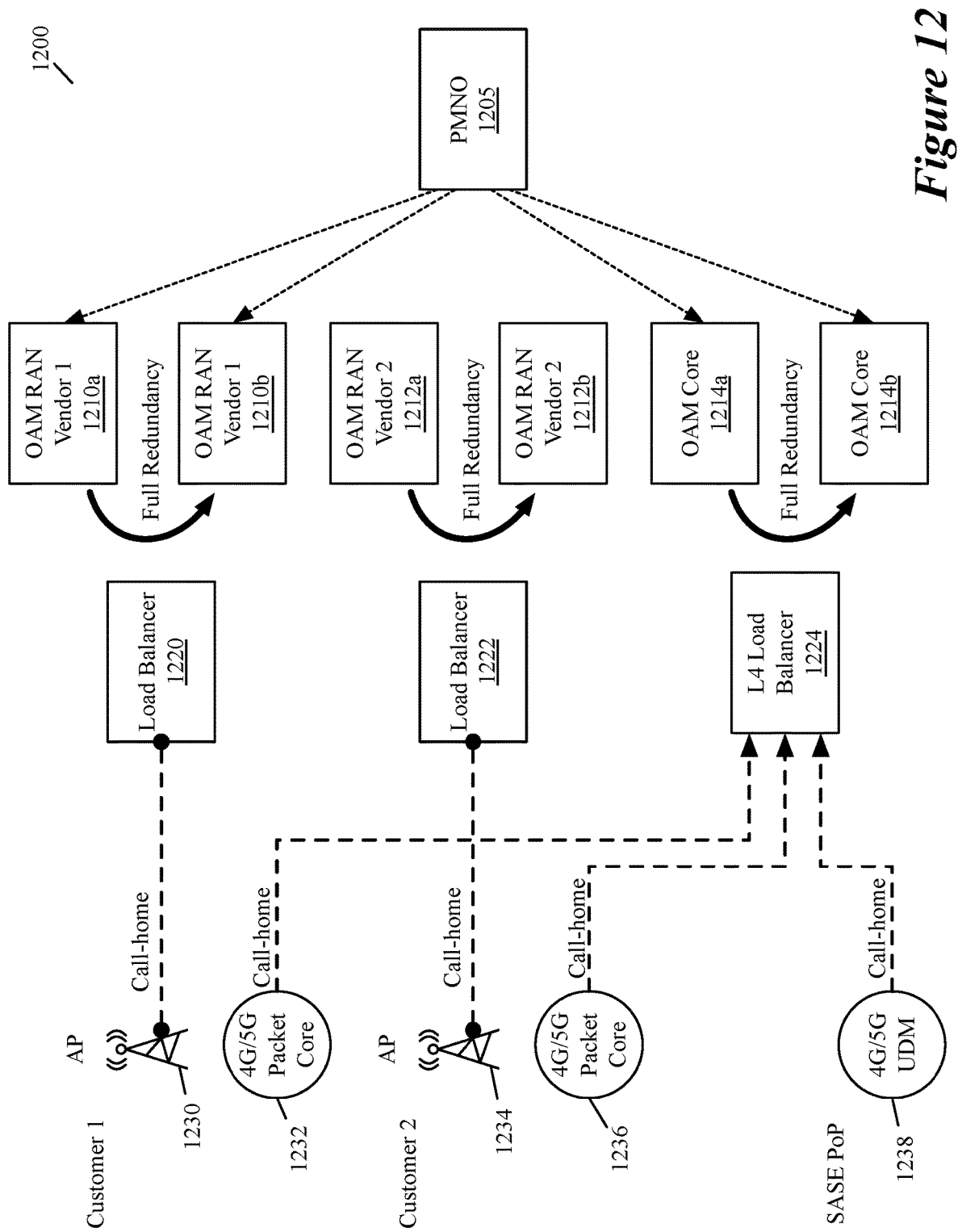
FIG. 12 conceptually illustrates a diagram of the OAM architecture of some embodiments for a multi-tenant SD-PMN.

FIG. 12 conceptually illustrates a diagram of the OAM architecture of some embodiments for a multi-tenant SD- PMN. The diagram 1200 includes a PMNO 1205, RAN OAM servers 1210a and 1210b for a first vendor, RAN OAM servers 1212a and 1212b for a second vendor, core OAM servers 1214a and 1214b, a load balancer 1220 for connecting to an access point 1230 of the first RAN vendor on a first customer's premise, a load balancer 1222 for connecting to an access point 1234 of the second RAN vendor on a second customer's premise, and a load balancer 1224 for connecting to the distributed 4G/5G packet core components including the 4G/5G packet core components 1232 on the first customer's premise, the 4G/5G packet core components 1236 on the second customer's premise, and the 4G/5G UDM 1238 located in the SASE PoP of the SD-PMN provider (e.g., an SD-WAN PoP). Each OAM server pair has full redundancy as illustrated and are configured as active/ active pairs, according to some embodiments.

It should be noted that in some embodiments, rather than terminating at the load balancers 1220 and 1222, the con- nections from the access points 1230 and 1234 instead terminate at security gateways associated with the respective RANs. The security gateways in some such embodiments provide unique identifiers for each access point 1230 and 1234 to their respective RAN OAM servers 1210a-1210b and 1212a-1212b so that each customer can be uniquely identified through the security gateway.

As mentioned above, the PMNO 1205 is configured to support multiple RAN vendors based on preferences of the managed service provider (MSP). When a customer is onboarding, in some embodiments, an MSP can select one or more RAN vendor templates based on deployment criteria (or criterion). Based on the selected RAN vendor template(s), the PMNO 1205 associates the RAN OAM server's IP address with the customer and site, according to some embodiments. Once the associations have been made, any subsequent changes to the 5G core and/or RAN deployment from a user portal would trigger the PMNO 1205, in some embodiments, to invoke vendor-specific APIs against the OAM server endpoints 1210*a*-1214*b*.

Figure 13:
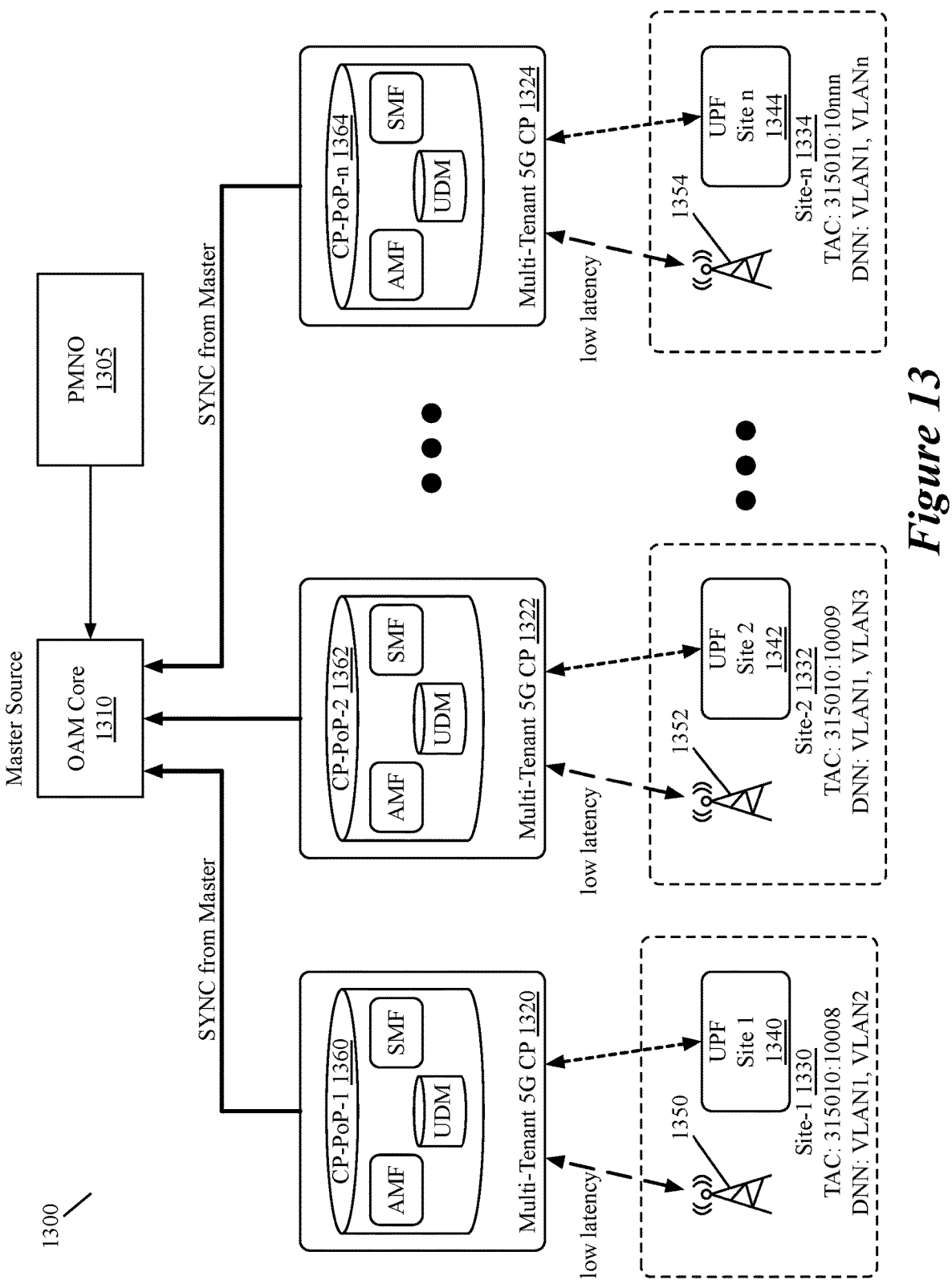
FIG. 13 conceptually illustrates an architecture diagram of a centrally managed SD-PMN of some embodiments.
Figure 14:
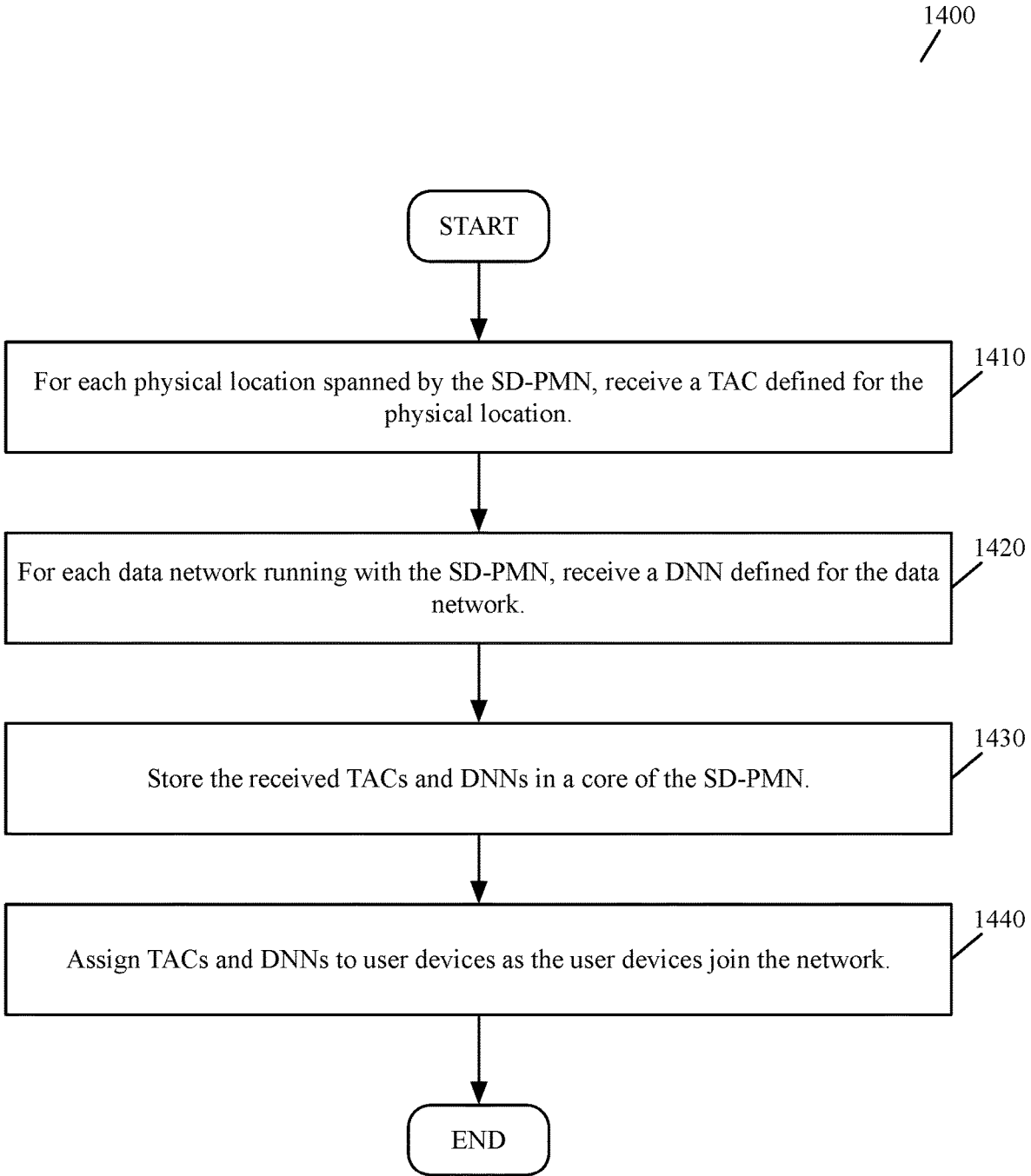
FIG. 14 conceptually illustrates a process of some embodiments for centrally managing a SD-PMN.

The parameters assigned by the centralized management system include TACs for different customer premise locations, and DNNs for the different data networks operating in the SD-PMN. FIG. 13 conceptually illustrates an architecture diagram of a centrally managed SD-PMN of some embodiments after TACs and DNNs have been assigned. As shown, the diagram 1300 includes multiple sites 1330, 1332, and 1334 each having a respective UPF 1340, 1342, and 1344 deployed for the site and at least one respective access point 1350, 1352, and 1354. In addition to the multiple sites, multiple multi-tenant 5G control planes 1320, 1322, and 1324 are deployed to PoPs 1360, 1362, and 1364 throughout the SD-PMN and that connect to a single core 1310 that is centrally managed by a PMN orchestrator 1305. The single core 1310 is a master source for the control plane instances 1320-1324 and syncs with each control plane instance 1320-1324 as indicated. The diagram 1300 will be further described below by reference to FIG. 14, which conceptually illustrates a process of some embodiments for centrally managing a SD-PMN. The process 1400 is performed in some embodiments by a centralized management server for the SD-PMN, such as the PMN orchestrator 1305 in the diagram 1300.

The process 1400 starts when for each physical location spanned by the SD-PMN, the process receives (at 1410) a TAC defined for the physical location. In some embodiments, the PMN orchestrator 1305 is a server that provides a user interface (UI) through which a user (e.g., network administrator) can provide input such as TACs defined for physical locations spanned by the SD-PMN. The UI, in some embodiments, includes multiple selectable UI items for providing the input and configuring other aspects of the SD-PMN through, e.g., drop down menus, radio buttons, selection boxes, text fields, etc. For instance, in some embodiments, the UI includes a particular text field or set of text fields for defining TACs for each of the physical locations. The UI, in some embodiments, requires the TACs to follow a particular format, such as by using hexadecimal values that is two octets in length.

In the diagram 1300, each of the sites 1330-1334 includes a unique TAC. For example, the first site 1330 is assigned the TAC 315010:10008, the second site 1332 is assigned the TAC 315010:10009, and the last site 1334 is assigned the TAC 315010:10nnn. Each TAC is an identifier of the physical location area within the SD-PMN and is unique across all of the physical locations. The TACs, in some embodiments, are also associated with the access points 1350-1354 deployed in the respective physical locations such that the TACs can be used to identify a physical location and/or one or more access points in a physical location.

For each data network running with the SD-PMN, the process 1400 receives (at 1420) a DNN defined for the data network. In some embodiments, multiple VLANs (virtual local area networks) are implemented within the SD-PMN and are each assigned a respective DNN that spans all of the physical locations spanned by the SD-PMN. The UI provided by the management server of some embodiments includes multiple UI items for defining the DNNs in addition to the multiple UI items for defining the TACs as mentioned above. In some embodiments, a portion of the DNN is determined by the type of data network being named (e.g., "VLAN"), and a text field is provided to enable the user to further define the DNN by, e.g., adding a number or series of numbers.

Because the data networks span all of the physical locations, each physical location of some embodiments may be associated with a particular data network and DNN or set of data networks and DNNs. For example, in the diagram 1300, the first site 1330 is associated with DNNs VLAN2 and VLAN2, the second site 1332 is associated with DNNs VLAN1 and VLAN3, and the last site 1334 is associated with DNNs VLAN1 and VLANn, as illustrated. Because each data network (and associated DNN) spans all of the physical locations, the VLAN1 is included in the DNNs associated with each site. While each site 1330-1334 is shown as having two associated DNNs, other sites in other embodiments can have more associated DNNs or fewer associated DNNs than illustrated.

The process 1400 stores (at 1430) the received TACs and DNNs in a core of the SD-PMN. The PMN orchestrator 1305 of some embodiments stores the received TACs and DNNs in the core 1310, which syncs with the control plane instances 1320-1324 deployed to the PoPs 1360, 1362, and 1364. Because each control plane instance 1320-1324 is the same as each other control plane instance 1320-1324, each control plane instance 1320-1324 is aware of the TAC defined for and assigned to each physical site, as well as the DNNs defined for and assigned to each data network in the SD-PMN.

The process 1400 assigns (at 1440) TACs and DNNs to user devices as the user devices join the network. In some embodiments, the UPF assigns the new user device's traffic to a particular DNN or set of DNNs. When a user device moves to a new primary location, in some embodiments, an updated TAC or set of TACs is subsequently assigned to the user device based on the new location of the user device. For instance, a user device of some embodiments can join the SD-PMN while being primarily located at the first site 1330 in the diagram 1300, and later change its primary location to the last site 1334. As such, the TAC associated with the user device would be updated from 315010:10008 to 315010:10nnn in some such embodiments. Following 1440, the process 1400 ends.

In some embodiments, an SD-PMN may be implemented as a fixed wireless network for a particular geographic location. For example, a rural area might require internet access, while managed service providers (e.g., internet service providers, mobile network service providers, etc.) decline to deploy service for that rural area due to factors such as cost to the service provider. FIG. 15 conceptually illustrates a process of some embodiments for implementing an SD-PMN as a fixed wireless network for a particular geographic location. The process 1500 will be described below with references to FIG. 16, which conceptually illustrates the architecture of a fixed wireless network of some embodiments.

The process 1500 starts when for each physical location in a set of physical locations within the particular geographic area, the process deploys (at 1510) an SD-WAN customer premise appliance. In the architecture diagram 1600, SD-WAN edge routers 1610 are deployed to homes 1615 within a particular geographic area for which the SD-PMN is being implemented. The SD-WAN edge routers 1610 are enabled with LTE (long term evolution), 4G, or 5G SIM, according to some embodiments. Each home premise within the geographic area for which the SD-PMN is being implemented, in some embodiments, will have an SD-WAN edge router to stretch the SD-PMN to that home premise.

The process 1500 establishes (at 1520), via a RAN, a set of connections between each SD-WAN customer premise appliance and at least one physical access point deployed to the particular geographic area. Each of the SD-WAN edge routers 1610 at the home premises 1615 has a connection to the network of towers 1620 in the diagram 1600, as shown. The connections between the SD-WAN edge routers 1610 and the towers (i.e., access points) 1620 are LTE, 4G, or 5G connections via CBRS (citizens broadband radio service), in some embodiments.

In some embodiments, the SD-WAN edge routers deployed to home premises (or other location types in the geographic area) are provided by the service provider of the SD-PMN and act as general residential broadband customer premise equipment (CPEs), while the access points (i.e. base stations, antennas, towers, etc.) deployed to the geographic area are provided by a third-party network equipment vendor and paid for by the entity for which the SD-PMN is being implemented. Examples of such entities can include corporations, educational campuses, and municipalities (e.g., towns, cities, etc.), according to some embodiments.

The process 1500 connects (at 1530) each physical access point deployed to the particular geographic area to a central aggregation point to enable internet access for the particular geographic area. The network of towers 1620, for example, connects to the UPF 1630 that is part of the edge compute stack 1625. The access points in the network of towers 1620, in some embodiments, aggregate layer 2 (L2) traffic that terminates at the distributed UPF 1630. From the UPF 1630, the traffic goes through an aggregator SD-WAN edge router 1635 toward the SD-WAN gateway 1650 at the SASE PoP 1640, which also includes a 5G core 1655. The SASE PoP 1640 provides optimized internet connectivity, according to some embodiments.

The process 1500 uses (at 1540) the established set of connections to provide SD-PMN service to the particular geographic area. That is, once the connections have been established, user devices at the home premises 1615 can access the internet 1660 through the series of connections that start from the SD-WAN edge routers 1610. The SD-PMN is controlled and managed as described in the embodiments above. Following 1540, the process 1500 ends.

The fixed wireless solution described above differs from the architectures described by other embodiments of the invention in that the fixed wireless network 1600 uses an SD-WAN edge router as customer premise equipment to connect to the network, thus creating two layers of SD-WAN. The first layer provides the connection (e.g., a VCMP (VeloCloud multipath) tunnel) between the SD-WAN edge routers 1610 at the home premises 1615 (or other premises types for other entities) and the SD-WAN gateway 1650 at the SD-WAN/SASE PoP 1640 of the SD-PMN provider, and the second layer provides the connection between the SD-WAN edge router 1635 that is part of the edge compute stack 1625 and the SD-WAN gateway 1650 at the SD-WAN/SASE PoP 1640 of the SD-PMN provider. Despite the two layers of SD-WAN, the SD-WAN edge router 1635 that is part of the edge compute stack 1625 does not utilize double tunneling and instead uses the first tunnel established by the SD-WAN edge routers 1610 on the underlay, while still protecting against failures on multiple WAN links and providing optimized fixed wireless access for WAN users.

The tunnel established from the SD-WAN edge routers 1610 to the SD-WAN gateway 1650 is optimized, in some embodiments, using DMPO, like in the other embodiments described above. In some embodiments, the SD-WAN edge router 1635 only sends traffic for which DMPO or any other optimization is desired to the SD-WAN gateway 1650, and sends any other traffic to its destination without going through the SD-WAN gateway 1650, while in other embodiments, all traffic is sent to its destination through the SD-WAN gateway 1650. In some embodiments, sending all traffic through the SD-WAN gateway 1650 is desirable based on the 5G core 1655 for the SD-PMN also being located in the PoP 1640.

Figure 17:
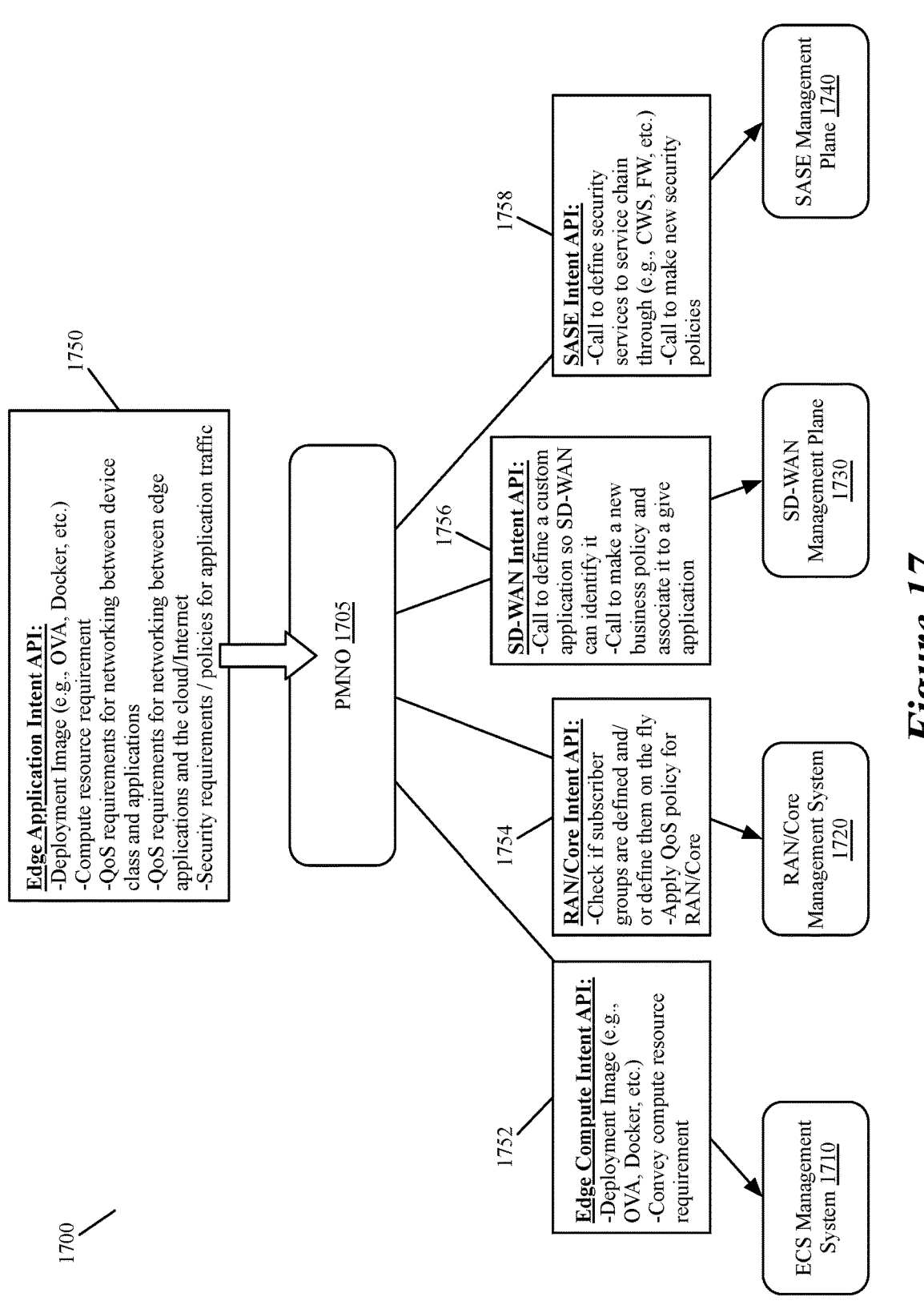
FIG. 17 conceptually illustrates a diagram of a joint orchestration platform of some embodiments that orchestrates applications end-to-end across an SD-PMN, SD-WAN, and edge compute stack.

Some embodiments of the invention implement joint orchestration across an SD-PMN, SD-WAN, and edge compute stacks to enable customers to describe desired edge applications to be deployed alongside connectivity and QoS requirements, and to use the provided descriptions to orchestrate the edge application, connectivity, and QoS requirements across the SD-PMN, SD-WAN, and edge compute stack to yield the desired end-to-end connectivity and QoS for the desired edge application and any devices accessing the desired edge application. FIG. 17 conceptually illustrates a diagram of a joint orchestration platform of some embodiments that orchestrates applications end-to-end across an SD-PMN, SD-WAN, and edge compute stack.

As shown, the joint orchestration platform diagram 1700 includes a PMN orchestrator (PMNO) 1705, an edge compute stack (ECS) management system 1710, a RAN/Core management system 1720, an SD-WAN management plane 1730, and a SASE management plane 1740. Examples of an ECS management system, in some embodiments, include VMware Telco Cloud Automation (TCA) and VMware Tanzu Kubernetes Grid (TKG). An example of both the SD-WAN management plane and the SASE management plane are orchestrators, in some embodiments, is the VeloCloud Orchestrator (VCO).

As shown, the PMNO 1705 has northbound intent-based APIs 1750 (application programming interfaces) to collect edge application connectivity requirements. The northbound APIs 1750 can include edge application connectivity requirements such as edge application workload compute, storage, and networking requirements; device groups that need connectivity to the application and at what QoS level; and any QoS requirements needed between the edge application and the cloud. The northbound intent-based APIs 1750 are defined by a user (e.g., network administrator) that manages the joint orchestration platform 1700, according to some embodiments.

After receiving these requirements, the PMNO 1705 takes these requirements and uses southbound APIs in some embodiments to deploy the workload on the ECS, make a subscriber group for devices that need connectivity to the edge application and configure appropriate data networking for that subscriber group (e.g., VLAN, QoS, etc.), and program business policies in the orchestrator (e.g., management server) for the SD-WAN. As illustrated, the intent-based API 1752 is sent to the ECS management system 1710, the intent-based API 1754 is sent to the RAN/Core management system 1720, the intent-based API 1756 is sent to the SD-WAN management plane 1730, and the intent-based API 1758 is sent to the SASE management plane 1740. As a result of the joint orchestration platform 1700, end-to-end SLAs (service-level agreements) can be met for the entire system.

FIG. 18 illustrates a joint orchestration platform diagram that includes a set of example intent-based APIs for orchestrating a video analytics application, in some embodiments, across an SD-PMN, SD-WAN, and edge compute stack. The joint orchestration platform 1800 includes a PMNO 1805, ECS management system 1810, RAN/Core management system 1820, SD-WAN management plane 1830, and SASE management plane 1840. In this example, the PMNO 1805 receives (i.e., from a network administrator) an intent-based API 1850 that is defined for a video analytics application "X". The intent-based API 1850 includes a URL for the application's container image (i.e., an unchangeable, standalone, static file that includes executable code and well-defined assumptions about the application's run-time environment), specifications indicating the application requires high priority compute resources and high QoS connectivity between cameras and the application, specifications indicating the application requires high priority internet communication, and an indication that internet traffic associated with the application requires URL filtering.

After the PMNO 1805 receives the intent-based API 1850, the PMNO 1805 generates intent-based APIs for each of the management systems and planes 1810-1840 to implement and orchestrate the video analytics application "X". Each requirement defined in the intent-based API 1850 corresponds to a different orchestration platform within the joint orchestration platform 1800. For example, definitions relating to the application itself (e.g., the container image URL) and its compute resources are directed to the ECS management system, definitions regarding QoS requirements are directed to the RAN/Core management system, definitions regarding traffic priority are directed to the SD-WAN management plane, and definitions regarding URL filtering are directed to the SASE management plane, according to some embodiments.

As such, based on the application container image URL and high priority compute resources defined in the intent-based API 1850, the PMNO 1805 generates the intent-based API 1852 to direct the ECS management system 1810 to deploy the application image with required resources for the application. Based on the high QoS connectivity requirement between the cameras and the video analytics application defined in the intent-based API 1850, the PMNO 1805 generates the intent-based API 1854 to direct the RAN/Core management system 1820 to define cameras as a subscriber group and apply the required QoS policy for the RAN and core. Based on the requirement for high priority Internet communication defined for the application in the intent-based API 1850, the PMNO 1805 generates the intent-based API 1854 to direct the SD-WAN management plane 1830 to identify application traffic and add a business policy for prioritizing that traffic. Lastly, based on the URL filtering for Internet traffic defined in the intent-based API 1850, the PMNO 1805 generates the intent-based API 1858 to direct the SASE management plane 1840 to create a URL filtering security policy for the application and service chain cloud web security (CWS). After each management system and plane 1810-1840 receives its respective intent-based API 1852-1858, the video analytics application "X" is implemented across the SD-PMN.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
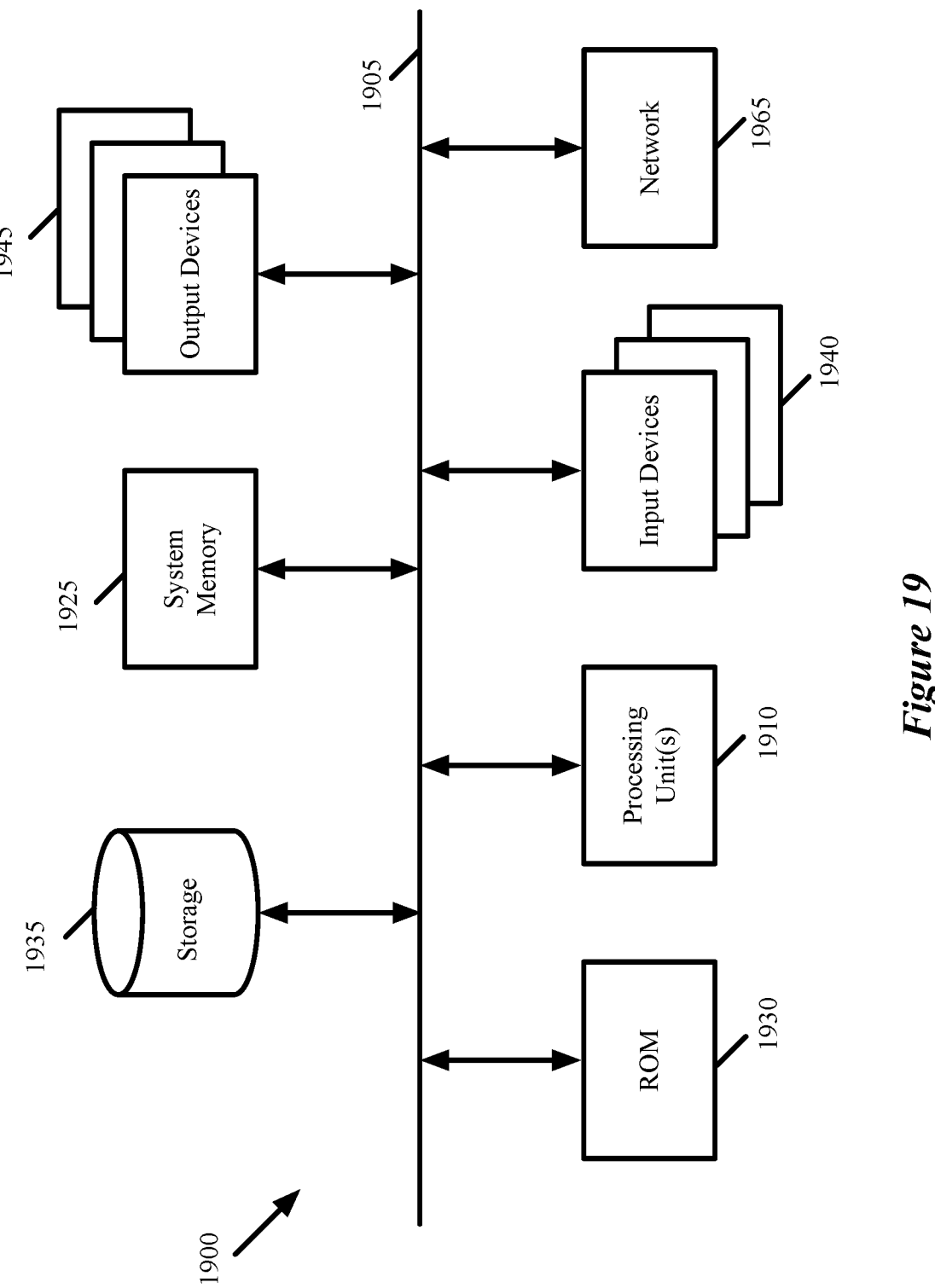
FIG. 19 conceptually illustrates a computer system with which some embodiments of the invention are implemented.

FIG. 19 conceptually illustrates a computer system 1900 with which some embodiments of the invention are implemented. The computer system 1900 can be used to implement any of the above-described hosts, controllers, gateway, and edge forwarding elements. As such, it can be used to execute any of the above described processes. This computer system 1900 includes various types of non-transitory machine-readable media and interfaces for various other types of machine-readable media. Computer system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the computer system 1900. For instance, the bus 1905 communicatively connects the processing unit(s) 1910 with the read-only memory 1930, the system memory 1925, and the permanent storage device 1935.

From these various memory units, the processing unit(s) 1910 retrieve instructions to execute and data to process in order to execute the processes of the invention. The processing unit(s) 1910 may be a single processor or a multi-core processor in different embodiments. The read-only-memory (ROM) 1930 stores static data and instructions that are needed by the processing unit(s) 1910 and other modules of the computer system 1900. The permanent storage device 1935, on the other hand, is a read-and-write memory device. This device 1935 is a non-volatile memory unit that stores instructions and data even when the computer system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory 1925 is a volatile read-and-write memory, such as random access memory. The system memory 1925 stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieve instructions to execute and data to process in order to execute the processes of some embodiments.

The bus 1905 also connects to the input and output devices 1940 and 1945. The input devices 1940 enable the user to communicate information and select commands to the computer system 1900. The input devices 1940 include alphanumeric keyboards and pointing devices (also called "cursor control devices"). The output devices 1945 display images generated by the computer system 1900. The output devices 1945 include printers and display devices, such as cathode ray tubes (CRT) or liquid crystal displays (LCD). Some embodiments include devices such as touchscreens that function as both input and output devices 1940 and 1945.

Finally, as shown in FIG. 19, bus 1905 also couples computer system 1900 to a network 1965 through a network adapter (not shown). In this manner, the computer 1900 can be a part of a network of computers (such as a local area network ("LAN"), a wide area network ("WAN"), or an Intranet), or a network of networks (such as the Internet). Any or all components of computer system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of authenticating and authorizing user devices requesting to access an SD-PMN (software-defined private mobile network) deployed for a particular geographic area, the method comprising:

from a new user device, receiving a request to access the SD-PMN;

performing a look-up in a UDM (unified data management) comprising user information for a plurality of users authorized to access the SD-PMN to determine whether the new user device is authorized to access the SD-PMN; and upon determining that the new user device is authorized, directing a UPF (user plane function) deployed for the SD-PMN to enable the new user device to access the SD-PMN;

wherein receiving the request to access the SD-PMN from the new user device comprises receiving the request to access the SD-PMN from an SD-WAN edge router deployed to a same location in the particular geographical area as the new user device;

wherein the SD-PMN includes on-premises equipment having a radio access network (RAN) and the SD-WAN edge router which reside at an on-premises location;

wherein the SD-PMN further includes SD-WAN point of presence (POP) equipment having the UDM, the SD-WAN POP equipment residing at an SD-WAN POP location which is different from the on-premises location;

wherein one of the on-premises equipment residing at the on-premises location and the SD-WAN POP equipment residing at the SD-WAN PoP location further has an access and mobility management function (AMF); and wherein performing the look-up in the UDM includes:

accessing the UDM of the SD-WAN POP equipment at the SD-WAN POP location to authenticate the new user device after the request to access the SD-PMN is received by the AMF through the RAN at the on-premises location.

2. The method of claim 1, wherein performing the look-up in the UDM to determine whether the new user device is authorized to access the SD-PMN comprises performing a look-up in the UDM to determine whether a user identifier associated with the new user device is included in a list of user identifiers associated with users that are authorized to access the SD-PMN.

3. The method of claim 2, wherein each user identifier is associated with one or more user devices.

4. The method of claim 3, wherein each user device associated with a particular user is required to be authenticated based on a particular user identifier associated with the particular user.

5. The method of claim 1, wherein directing the UPF deployed for the SD-PMN to enable the new user device to access the SD-PMN comprises directing the UPF to (i) provide the new user device with an IP (Internet protocol) address, (ii) enable a particular QoS (quality of service) for the new user device, and (iii) identify one or more subnets of the SD-PMN on which to put traffic associated with new user device.

6. The method of claim 1, wherein the method is performed by a set of control plane components deployed for the SD-PMN, the set of control plane components comprising at least the AMF and an SMF (session management function).

7. The method of claim 1, wherein the new user device is a first new user device and the request to access the SD-PMN is a first request to access the SD-PMN, the method further comprising:

from a second new user device, receiving a second request to access the SD-PMN;

performing a look-up in the UDM to determine whether the second new user device is authorized to access the SD-PMN; and upon determining that the second new user device is not authorized, sending a reply to the second new user device to indicate that the second new user device is not authorized to access the SD-PMN.

8. The method of claim 1, wherein the new user device connects to the SD-WAN edge router via one of an LTE (long term evolution) connection, a 4G connection, and a 5G connection.

9. The method of claim 8, wherein the SD-WAN edge router has a connection to the SD-PMN via a tower deployed to the particular geographical area as part of a RAN (radio access network) of the SD-PMN.

10. The method of claim 9, wherein the connection between the SD-WAN edge router and the tower comprises one of an LTE connection, a 4G connection, and a 5G connection via CBRS (citizens broadband radio service).

11. The method of claim 1, wherein the AMF belongs to the on-premises equipment and resides at the on-premises location.

12. The method of claim 1, wherein the AMF belongs to the SD-WAN POP equipment and resides at the SD-WAN POP location.

13. A non-transitory machine readable medium storing a program for execution by a set of processing units, the program for authenticating and authorizing user devices requesting to access an SD-PMN (software-defined private mobile network) deployed for a particular geographic area, the program comprising sets of instructions for:

from a new user device, receiving a request to access the SD-PMN; performing a look-up in a UDM (unified data management) comprising user information for a plurality of users authorized to access the SD-PMN to determine whether the new user device is authorized to access the SD-PMN; and upon determining that the new user device is authorized, directing a UPF (user plane function) deployed for the SD-PMN to enable the new user device to access the SD-PMN;

wherein the set of instructions for receiving the request to access the SD-PMN from the new user device comprises a set of instructions for receiving the request to access the SD-PMN from an SD-WAN edge router deployed to a same location in the particular geographical area as the new user device;

wherein the SD-PMN includes on-premises equipment having a radio access network (RAN), an access and mobility management (AMF) function, and the SD-WAN edge router which reside at an on-premises location;

wherein the SD-PMN further includes SD-WAN point of presence (POP) equipment having the UDM, the SD- WAN POP equipment residing at an SD-WAN POP location which is different from the on-premises location; and wherein performing the look-up in the UDM includes:

accessing the UDM of the SD-WAN POP equipment at the SD-WAN POP location to authenticate the new user device after the request to access the SD-PMN is received by the AMF at the on-premises location through the RAN at the on-premises location.

14. The non-transitory machine readable medium of claim 13, wherein the set of instructions for performing the look-up in the UDM to determine whether the new user device is authorized to access the SD-PMN comprises a set of instructions for performing a look-up in the UDM to determine whether a user identifier associated with the new user device is included in a list of user identifiers associated with users that are authorized to access the SD-PMN.

15. The non-transitory machine readable medium of claim 14, wherein each user identifier is associated with one or more user devices; and wherein each user device associated with a particular user is required to be authenticated based on a particular user identifier associated with the particular user.

16. The non-transitory machine readable medium of claim 13, wherein the set of instructions for directing the UPF deployed for the SD-PMN to enable the new user device to access the SD-PMN comprises a set of instructions for directing the UPF to (i) provide the new user device with an IP (Internet protocol) address, (ii) enable a particular QoS (quality of service) for the new user device, and (iii) identify one or more subnets of the SD-PMN on which to put traffic associated with new user device.

17. The non-transitory machine readable medium of claim 13, wherein the new user device is a first new user device and the request to access the SD-PMN is a first request to access the SD-PMN, the program further comprising sets of instructions for:

from a second new user device, receiving a second request to access the SD-PMN;

performing a look-up in the UDM to determine whether the second new user device is authorized to access the SD-PMN; and upon determining that the second new user device is not authorized, sending a reply to the second new user device to indicate that the second new user device is not authorized to access the SD-PMN.

18. The non-transitory machine readable medium of claim 13, wherein the new user device connects to the SD-WAN edge router via one of an LTE (long term evolution) connection, a 4G connection, and a 5G connection.

19. The non-transitory machine readable medium of claim 18, wherein: the SD-WAN edge router has a connection to the SD-PMN via a tower deployed to the particular geographical area as part of a RAN (radio access network) of the SD-PMN; and the connection between the SD-WAN edge router and the tower comprises one of an LTE connection, a 4G connection, and a 5G connection via CBRS (citizens broadband radio service).

20. A non-transitory machine readable medium storing a program for execution by a set of processing units, the program for authenticating and authorizing user devices requesting to access an SD-PMN (software-defined private mobile network) deployed for a particular geographic area, the program comprising sets of instructions for:

from a new user device, receiving a request to access the SD-PMN; performing a look-up in a UDM (unified data management) comprising user information for a plurality of users authorized to access the SD-PMN to determine whether the new user device is authorized to access the SD-PMN; and upon determining that the new user device is authorized, directing a UPF (user plane function) deployed for the SD-PMN to enable the new user device to access the SD-PMN;

wherein the set of instructions for receiving the request to access the SD-PMN from the new user device comprises a set of instructions for receiving the request to access the SD-PMN from an SD-WAN edge router deployed to a same location in the particular geographical area as the new user device;

wherein the SD-PMN includes on-premises equipment having a radio access network (RAN) and the SD-WAN edge router which reside at an on-premises location;

wherein the SD-PMN further includes SD-WAN point of presence (POP) equipment having an access and mobility management (AMF) function and the UDM which reside at an SD-WAN POP location which is different from the on-premises location; and wherein performing the look-up in the UDM includes:

accessing the UDM of the SD-WAN POP equipment at the SD-WAN POP location to authenticate the new user device after the request to access the SD-PMN is received by the AMF at the SD-WAN POP location through the RAN at the on-premises location.

* * * * *